United States Patent
Hermann et al.

(10) Patent No.: US 11,011,783 B2
(45) Date of Patent: May 18, 2021

(54) THERMAL AND ELECTRICAL MANAGEMENT OF BATTERY PACKS

(71) Applicant: QuantumScape Corporation, San Jose, CA (US)

(72) Inventors: Weston Arthur Hermann, Palo Alto, CA (US); David E. Berkstresser, Los Gatos, CA (US); Stuart D. Barter, Amherst, NH (US); Phillip John Weicker, Pasadena, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 553 days.

(21) Appl. No.: 14/913,074

(22) PCT Filed: Oct. 22, 2014

(86) PCT No.: PCT/US2014/061761
§ 371 (c)(1),
(2) Date: Feb. 19, 2016

(87) PCT Pub. No.: WO2015/061443
PCT Pub. Date: Apr. 30, 2015

(65) Prior Publication Data
US 2016/0218401 A1    Jul. 28, 2016

Related U.S. Application Data

(60) Provisional application No. 61/895,553, filed on Oct. 25, 2013.

(51) Int. Cl.
*H01M 10/42* (2006.01)
*H01M 10/48* (2006.01)
(Continued)

(52) U.S. Cl.
CPC ..... *H01M 10/4257* (2013.01); *H01M 10/482* (2013.01); *H01M 10/486* (2013.01);
(Continued)

(58) Field of Classification Search
CPC .......... H01M 2/26; H01M 2/202–208; H01M 2/1077
See application file for complete search history.

(56) References Cited

U.S. PATENT DOCUMENTS

| | | | |
|---|---|---|---|
| 4,189,528 | A | 2/1980 | Klootwyk |
| 5,369,351 | A | 11/1994 | Adams |

(Continued)

FOREIGN PATENT DOCUMENTS

| | | |
|---|---|---|
| CN | 202507950 U | 10/2012 |
| DE | 102009046567 | 5/2011 |

(Continued)

OTHER PUBLICATIONS

European Search Report for Application No. 14154567.3 datedAug. 8, 2014; 9 pages.

(Continued)

*Primary Examiner* — Stephan J Essex
(74) *Attorney, Agent, or Firm* — Squire Patton Boggs (US) LLP

(57) ABSTRACT

Provided are battery packs and interface modules for electrically interconnecting electrochemical cells in the packs and for providing heat distribution with the packs. An interface module interfaces one side of all electrochemical cells in a battery pack. The interface module may have a substantially planar shape such that the space occupied by the module in the battery pack is minimal. Most, if not all, conductive components of the interface module may be formed from the same sheet of metal. In some embodiments, the interface module includes multiple bus bars such that (Continued)

each bus bar interconnects two or more terminals of different electrochemical cells in the battery pack. Each bus bar may have a separate voltage sense lead extending from the bus bar to a connecting portion. The bus bars may be flexibly supported within the module. The interface module may also include multiple thermistors disposed on different bus bars.

23 Claims, 13 Drawing Sheets

(51) Int. Cl.
| | |
|---|---|
| H01M 10/625 | (2014.01) |
| H01M 10/627 | (2014.01) |
| H01M 2/20 | (2006.01) |
| H01M 2/26 | (2006.01) |
| H01M 2/30 | (2006.01) |
| H01M 10/6571 | (2014.01) |
| H01M 10/6554 | (2014.01) |
| H01M 50/20 | (2021.01) |
| H01M 50/502 | (2021.01) |
| H01M 50/531 | (2021.01) |
| H01M 50/543 | (2021.01) |

(52) U.S. Cl.
CPC ....... *H01M 10/625* (2015.04); *H01M 10/627* (2015.04); *H01M 10/6554* (2015.04); *H01M 10/6571* (2015.04); *H01M 50/20* (2021.01); *H01M 50/502* (2021.01); *H01M 50/531* (2021.01); *H01M 50/543* (2021.01); *H01M 2010/4271* (2013.01); *H01M 2010/4278* (2013.01); *H01M 2220/10* (2013.01); *H01M 2220/20* (2013.01)

(56) References Cited

U.S. PATENT DOCUMENTS

| | | | |
|---|---|---|---|
| 5,482,790 | A | 1/1996 | Yamada et al. |
| 5,618,641 | A | 4/1997 | Arias |
| 6,271,648 | B1 | 8/2001 | Miller |
| 6,357,541 | B1 | 3/2002 | Matsuda et al. |
| 6,624,615 | B1 | 9/2003 | Park |
| 6,641,942 | B1 | 11/2003 | Rouillard et al. |
| 6,942,944 | B2 | 9/2005 | Al-Hallaj et al. |
| 7,148,637 | B2 | 12/2006 | Shu et al. |
| 7,154,068 | B2 | 12/2006 | Zhu et al. |
| 7,761,198 | B2 | 7/2010 | Bhardwaj |
| 7,933,695 | B2 | 4/2011 | Yamaguchi |
| 7,936,150 | B2 | 5/2011 | Milios |
| 8,190,320 | B2 | 5/2012 | Kelty et al. |
| 8,343,642 | B2 | 1/2013 | Culver et al. |
| 8,471,521 | B2 | 6/2013 | Stewart et al. |
| 8,543,270 | B2 | 9/2013 | Kelty et al. |
| 9,106,077 | B2 | 8/2015 | Nakahara et al. |
| 9,321,340 | B2 | 4/2016 | Maskew et al. |
| 9,362,546 | B1 | 6/2016 | Donnelly et al. |
| 9,393,921 | B1 | 7/2016 | Weicker et al. |
| 2001/0040061 | A1 | 11/2001 | Matuda et al. |
| 2002/0022178 | A1* | 2/2002 | Asaka ................ B60K 6/28 |
| | | | 429/158 |
| 2003/0008205 | A1 | 1/2003 | Hone et al. |
| 2003/0184307 | A1 | 10/2003 | Kozlowski et al. |
| 2003/0186116 | A1 | 10/2003 | Tanjou |
| 2004/0180263 | A1 | 9/2004 | Kase et al. |
| 2005/0084754 | A1 | 4/2005 | Klein |
| 2005/0248313 | A1 | 11/2005 | Thorland |
| 2006/0240318 | A1 | 10/2006 | Kim et al. |
| 2007/0087266 | A1 | 4/2007 | Bourke et al. |
| 2007/0166574 | A1 | 7/2007 | Nakashima et al. |
| 2008/0213652 | A1 | 9/2008 | Scheucher |
| 2008/0299451 | A1 | 12/2008 | Funahashi et al. |
| 2009/0123820 | A1 | 5/2009 | Han |
| 2009/0239130 | A1 | 9/2009 | Culver et al. |
| 2009/0243538 | A1 | 10/2009 | Kelty et al. |
| 2009/0325043 | A1 | 12/2009 | Yoon et al. |
| 2010/0082227 | A1 | 4/2010 | Posner et al. |
| 2010/0089547 | A1 | 4/2010 | King et al. |
| 2010/0217485 | A1 | 8/2010 | Ichishi |
| 2010/0258063 | A1 | 10/2010 | Thompson |
| 2010/0273042 | A1 | 10/2010 | Buck et al. |
| 2010/0273044 | A1 | 10/2010 | Culver et al. |
| 2010/0297483 | A1 | 11/2010 | Kawai |
| 2011/0076521 | A1* | 3/2011 | Shimizu ............. H01M 2/1061 |
| | | | 429/7 |
| 2011/0153140 | A1 | 6/2011 | Datta et al. |
| 2011/0159351 | A1 | 6/2011 | Culver et al. |
| 2011/0177383 | A1 | 7/2011 | Culver et al. |
| 2011/0267007 | A1 | 11/2011 | Chen et al. |
| 2012/0046815 | A1 | 2/2012 | Hermann et al. |
| 2012/0058377 | A1 | 3/2012 | Sastry et al. |
| 2012/0126753 | A1 | 5/2012 | Carkner et al. |
| 2012/0148889 | A1 | 6/2012 | Fuhr et al. |
| 2012/0158228 | A1 | 6/2012 | Biondo et al. |
| 2012/0295142 | A1 | 11/2012 | Yan et al. |
| 2012/0328908 | A1* | 12/2012 | Han .................... H01M 2/1061 |
| | | | 429/7 |
| 2013/0004804 | A1 | 1/2013 | Robertson et al. |
| 2013/0022848 | A1 | 1/2013 | Schroeter et al. |
| 2013/0059172 | A1 | 3/2013 | Sastry et al. |
| 2013/0101878 | A1 | 4/2013 | Pilgram et al. |
| 2013/0103240 | A1 | 4/2013 | Sato et al. |
| 2013/0202929 | A1* | 8/2013 | Kako .................... H01M 2/202 |
| | | | 429/90 |
| 2013/0218447 | A1 | 8/2013 | Mayinger |
| 2013/0230759 | A1 | 9/2013 | Jeong et al. |
| 2013/0280610 | A1 | 10/2013 | Hwang et al. |
| 2014/0023905 | A1* | 1/2014 | Taniyama ............ B60L 1/003 |
| | | | 429/120 |
| 2014/0038009 | A1 | 2/2014 | Okawa et al. |
| 2014/0041826 | A1 | 2/2014 | Takeuchi et al. |
| 2014/0070013 | A1 | 3/2014 | Stanek et al. |
| 2014/0093760 | A1 | 4/2014 | Hermann et al. |
| 2014/0117291 | A1 | 5/2014 | Amatucci et al. |
| 2014/0141300 | A1* | 5/2014 | Ronning ............. H01M 2/1077 |
| | | | 429/83 |
| 2014/0170493 | A1 | 6/2014 | Holme et al. |
| 2014/0227568 | A1 | 8/2014 | Hermann |
| 2014/0227597 | A1 | 8/2014 | Nemoto et al. |
| 2014/0265554 | A1 | 9/2014 | Yang et al. |
| 2014/0272564 | A1 | 9/2014 | Holme et al. |
| 2014/0279723 | A1 | 9/2014 | McGavran et al. |
| 2014/0284526 | A1 | 9/2014 | Shan |
| 2015/0000327 | A1 | 1/2015 | Kakehashi et al. |
| 2015/0037626 | A1 | 2/2015 | Malcolm et al. |
| 2015/0214586 | A1 | 7/2015 | Yeow et al. |
| 2015/0217622 | A1 | 8/2015 | Enomoto et al. |
| 2015/0217623 | A1 | 8/2015 | Hatakeyama et al. |
| 2015/0243974 | A1 | 8/2015 | Holme et al. |
| 2015/0255998 | A1 | 9/2015 | Hasegawa et al. |
| 2015/0258875 | A1 | 9/2015 | Enomoto et al. |
| 2016/0049655 | A1 | 2/2016 | Fasching et al. |
| 2016/0059733 | A1 | 3/2016 | Hettrich et al. |
| 2016/0068123 | A1 | 3/2016 | Helmhold et al. |
| 2016/0082860 | A1 | 3/2016 | Marchal et al. |
| 2016/0164135 | A1 | 6/2016 | Fasching et al. |
| 2016/0380315 | A1 | 12/2016 | Weicker et al. |

FOREIGN PATENT DOCUMENTS

| | | | |
|---|---|---|---|
| JP | 3585992 B2 | 11/2004 | |
| JP | 2010-281561 | 12/2010 | |
| JP | WO 2012160922 A1 * | 11/2012 | ............. B60L 1/003 |
| JP | 2012-236577 | 12/2012 | |
| WO | WO 2009/001916 A1 | 12/2008 | |
| WO | WO 2009/120369 A2 | 10/2009 | |
| WO | WO 2012/144148 | 10/2012 | |
| WO | WO 2014/061761 A1 | 10/2014 | |
| WO | WO 2015/010179 A1 | 1/2015 | |
| WO | WO 2015/031908 | 3/2015 | |
| WO | WO 2015/054320 | 4/2015 | |

(56) References Cited

FOREIGN PATENT DOCUMENTS

WO     WO 2015/076944     5/2015
WO     WO 2015/103548     7/2015
WO     WO 2016/106321     6/2016

OTHER PUBLICATIONS

International Search Report and Written Opinion of PCT/US2015/010179 dated Apr. 21, 2015, 11 pages.

Plichta et al., "Low Temperature Electrolyte for Lithium and Lithium-Ion Batteries", Proceedings of the 38th Power Sources Conference, Jun. 8-11, 1998, pp. 444-447.

Wang et al., "Conversion Reaction Mechanisms in Lithium Ion Batteries: Study of the Binary Metal Fluoride Electrodes", Journal of the American Chemical Society, 2011, vol. 133, pp. 18828-18836.

* cited by examiner

THERMAL AND ELECTRICAL MANAGEMENT OF BATTERY PACKS

CROSS-REFERENCE TO RELATED APPLICATIONS

This application claims the benefit under 35 U.S.C. § 119(e) of U.S. Provisional Patent Application 61/895,553, entitled: "Thermal and Electrical Connections for Battery Systems" filed on 2013 Oct. 25, which is incorporated herein by reference in its entirety for all purposes.

BACKGROUND

Applications of batteries, in particular rechargeable batteries, continue to grow. Some fast growing areas utilize large battery packs, for example, for vehicle power trains and electrical grid balancing. The battery packs often have large capacities and high voltages achieved by interconnecting multiple electrochemical cells within the same pack. In some cases, hundreds and even thousands of electrochemical cells can be interconnected together in the same pack, which presents various design, manufacturing, performance, and safety challenges. For example, a typical 18650 lithium ion cell has an operating voltage of about 3.7V and a capacity of between about 9-12 Wh. A typical laptop may only need 6-9 of such cells. Likewise, a conventional lead acid battery pack used in vehicles for driving starters and powering minor electrical components uses 3-6 lead acid cells and produce a voltage of 6-12V and a capacity of about 0.5-1 kWh. Considering the low capacity and voltage of these conventional battery packs, very few requirements exist for interconnecting and monitoring individual electrochemical cells in these conventional packs.

On the other hand, a battery pack used for a vehicle drive train needs at least a 20-30 kWh battery to achieve a 60-80 mile range. Some automotive battery packs have capacities as large as 60-85 kWh. The battery packs also operate at high voltages, such as between about 200-500 Volts. Interconnecting electrochemical cells in such high capacity and high voltage battery packs in safe and efficient manner is very challenging. Another challenge comes from using high power or high energy density active materials for electrodes of individual electrochemical cells in the modern battery packs. These high power or high energy density active materials can, in some examples, be less stable and more volatile. Furthermore, electrochemical cells built with these high power active materials may require specific operating temperatures and controlled voltages to ensure safety and ensure adequate performance. For example, electrochemical cells generally do not function well at low temperatures due to the reduced ionic mobility at low temperature and other factors. At the same time, electrochemical cells may become unsafe when heated above certain temperatures leading to fire and explosions of the electrochemical cells. In addition to the ambient heating, electrochemical cells may experience self-heating during their charge and/or discharge and even thermal runaways. In general, close temperature and/or voltage monitoring of each electrochemical cell in a battery pack is often needed for some applications. This monitoring, in turn, adds complexity to design and fabrication of battery packs systems resulting in increased weight, size, cost, and risk of malfunctioning.

Conventional systems for monitoring the voltage and/or temperature of battery packs are often bulky or asymmetrical, and, as such, introduce wasted or vacant space around the battery pack when these systems are integrated in devices and vehicles. This wasted space means that, for a given volume in a device or vehicle, a lower total number of battery packs can be integrated, which degrades the device or vehicle's performance and increases production costs. In addition, many conventional systems are challenging to manufacture on large scales because these systems do not efficiently interface with battery packs or require multiple materials to be manufactured and assembled into a battery-interfacing monitoring module.

The disclosure herein sets forth, in part, solutions to the aforementioned problems as well as other unmet needs.

SUMMARY

Provided are battery packs and interface modules for electrically interconnecting electrochemical cells in the battery packs and for providing heat distribution with the battery packs. An interface module interfaces one side of all electrochemical cells in a battery pack. As such, the interface module may be also referred to as an interconnect modules or an interconnect board. The interface module may have a substantially planar shape such that the space occupied by the module in the battery pack is minimal. Most, if not all, conductive components of the interface module may be formed from the same sheet of metal or combination of metals. In some embodiments, the interface module includes multiple bus bars such that each bus bar interconnects two or more terminals of different electrochemical cells in the battery pack without shorting the cells in the pack. Each bus bar may have a separate voltage sense lead extending from the bus bar to a connecting portion. The bus bars may be flexibly supported within the module. The interface module may also include multiple thermistors disposed on different bus bars.

As used herein, the phrase "substantially planar" means a shape that does not deviate from a planar configuration by more than about 20% of the thickness of the component forming this shape, e.g., a surface. For example, if the interface module is about 5 millimeter thick, then the surface of the module can have deviations of up to about 1 millimeter or 2 millimeter from the plane defining this surface and still remain substantially planar.

As used herein, the phrase "energy storage electrode," refers to, for example, an electrode that is suitable for use in an energy storage device, e.g., a lithium rechargeable battery cell. Such an electrode is operable to conduct electrons and deliver or receive lithium ions during the charging and discharging of a rechargeable battery cell.

As used herein, the phrase "active electrode material," or "active material," refers to a material that is suitable for use in a lithium rechargeable battery cell and that is responsible for delivering or receiving lithium ions during the charging and discharging cycles of the battery cell. The active material may undergo a chemical reaction during the charging and discharging cycles. The same battery cell may include a positive active material and a negative active material. For examples, an active positive material may include a metal fluoride that converts to a metal and lithium fluoride during the discharge cycle of the battery cell containing this material.

The active materials referenced herein include, but are not limited to, conversion chemistry positive electrode active materials, such as a plurality of coated electrochemically active material particles, each having a core including a conversion material a coating such that the coating selectively isolates the conversion material from the electrolyte. The capacity of the active material may be greater than about 300 mAh/g. The conversion material may be a sulfide, oxide, halide, phosphide, nitride, chalcogenide, oxysulfide, oxyfluoride, sulfur-fluoride, or sulfur-oxyfluoride. The conversion material may include lithium and a fluoride of a metal (e.g., iron, manganese, nickel, copper, or cobalt). In some embodiments, the conversion material includes ferric fluoride, ferrous fluoride, $LiFeF_3$, and/or $Li_3FeF_6$ in a charged state. The electrochemically active material particles may also include a metal component (e.g., iron, nickel, or copper) and a lithium compound component intermixed with the metal component. In some embodiments, the coating includes an oxide (e.g., aluminum oxide ($Al_xO_y$)), a phosphate (e.g., aluminum phoshate ($Al_x(PO_4)_y$)), or a fluoride (e.g., aluminum fluoride ($AlF_x$)). The coating may be partially lithiated. The coating may include two or more layers, each layer having a thickness between about 0.5 nm and about 15 nm. In some embodiments, the median coating coverage is at least about 90% of the surface area of the particles. In some embodiments, the positive electrode material includes a composite, which has an iron and fluoride containing compound, and a conductive matrix, which has an ionic conductive matrix, an electronic conductive matrix, or a combination thereof. The composite may include an iron oxy-fluoride compound having the formula $FeO_xF_{2-y}$, where $0<y\leq1$ and where $0<x\leq1$. In some embodiments, $x=y$ in $FeO_xF_{2-y}$. The iron and fluoride containing compound may include at least one additional metal, such as Li, Mn, Ni, Co, Cu, Ti, V, Cr, Ag, Bi, Sn, Sb, Pb, Mo, or Nb. In some embodiments, the iron and fluoride containing compound is an iron oxyfluoride nanocrystallite. The iron oxyfluoride nanocrystallite may have a primary domain size from about 1 nm to about 100 nm. In some embodiments, the conductive matrix is an electronic conductive matrix including carbon. The conductive matrix may be a mixed conductor and/or a metal oxide, a metal sulfide, a metal sulfate, or an inorganic phosphate (e.g., an iron phosphate, iron fluoro-phosphate, lithium iron phosphate, or lithium iron fluoro-phosphate).

In some examples, the negative electrode active material is lithium metal. The negative electrode active material may be processed using sintering temperatures that are high enough to melt the lithium metal used as the active anode material.

As used herein, the phrase "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container As used herein, the phrase "battery pack" shall mean an assembly of multiple battery cells packaged for use as a unit. A battery pack may include any number of battery cells. These cells may be interconnected using in series connections, parallel connections, and various combinations thereof.

For purposes of this disclosure, a battery pack is defined as an assembly of multiple interconnected electrochemical cells. An electrochemical cell is defined as a self-contained unit having one or more positive electrodes and one or more negative electrodes, wherein the positive and negative electrodes are separated by an electrolyte. The one or more positive electrodes are in ionic communication only with the one or more negative electrodes of the same electrochemical cell. The electrodes of one cell do not have ionic communication with the electrodes of any other cell. Each electrode may include a current collector and one or more active material layers disposed on the surface of the current collector. The one or more active material layers include active materials and optionally other components, such as conductive additives and binders. The current collector may provide mechanical support to the one or more active material layers and electronic communication between the one or more active material layers and a cell terminal. The cell terminals of different electrochemical cells are interconnected within battery pack.

In some embodiments, a battery pack comprises a plurality of electrochemical cells. Each electrochemical cell comprises a first terminal and a second terminal. The battery pack also comprises an interface module having a substantially planar shape. For purposes of this disclosure, a substantially planar shape is defined as a shape, in which one dimension is substantially smaller than each of the two other dimensions. For example, the thickness of the interface module may be at least about 5 times smaller than each of the length and the width of the interface module. In some embodiments, the thickness of the interface module is at least about 10 times smaller than each of the length and the width of the interface module. The plane defined by the interface module may be substantially parallel to the top surfaces of the electrochemical cells. The interface module may be conformal to the top surfaces of the electrochemical cells. In some embodiments, the interface module has a thickness of less than 10 millimeters. In some embodiments, the thickness of the interface module is at least about 15 times smaller than each of the length and the width of the interface module. In some embodiments, the thickness of the interface module is at least about 20 times smaller than each of the length and the width of the interface module. In some embodiments, the thickness of the interface module is at least about 25 times smaller than each of the length and the width of the interface module. In some embodiments, the thickness of the interface module is at least about 30 times smaller than each of the length and the width of the interface module. In some embodiments, the interface module has a thickness of about 1, 2, 3, 4, 5, 6, 7, 8, 9, or 10 mm. In some embodiments, the interface module has a thickness of about 1 mm, about 2 mm, about 3 mm, about 4 mm, about 5 mm, about 6 mm, about 7 mm, about 8 mm, about 9 mm, or about 10 mm. In some embodiments, the interface module has a thickness of about 1 mm. In some embodiments, the interface module has a thickness of about 2 mm. In some embodiments, the interface module has a thickness of about 3 mm. In some embodiments, the interface module has a thickness of about 4 mm. In some embodiments, the interface module has a thickness of about 5 mm. In some embodiments, the interface module has a thickness of about 6 mm. In some embodiments, the interface module has a thickness of about 7 mm. In some embodiments, the interface module has a thickness of about 8 mm. In some embodiments, the interface module has a thickness of about 9 mm. In some embodiments, the interface module has a thickness of about 10 mm.

In some examples, the interface module is dimensioned approximately 150 mm×300 mm on the top surface area, and is about 2-5 mm thickness. In some examples, the interface module is dimensioned approximately 80 mm×200 mm on the top surface area, and is about 2-5 mm thickness.

In some embodiments, the interface module comprises two or more bus bars and a base. Each bus bar comprises an electrically conductive material. (e.g., Al, Cu, Ni, alloys, stainless steel, or brass) In some embodiments, all bus bars comprise the same material. The base comprises an electrically insulating material that allows different bus bar to operate at different potentials. The base mechanically supports the bus bars. For purposes of this disclosure, an electrically insulating material (polymers, engineering polymers such as, but not limited to, pps, nylon, polycarbonate) is defined as a material that has a sufficiently high electrical resistivity and a sufficiently high dielectric strength to maintain adjacent bus bars at different potential for given applications. For example, the electrically insulating material of the base may have a resistivity of at least about $10^3$ Ohm/square or, more specifically, of at least about $10^9$ Ohm/square. The dielectric strength of the electrically insulating material of the base may be at least about 1 kV/mm or may even be at least about 5 kV/mm. For purposes of this disclosure, the electrically conductive material is defined as a material that has a sufficiently low electrical resistivity that allows maintaining a sufficiently constant potential within different locations of the component made from this material, e.g., within each bus bar. For example, the electrically conducting material of the bus bars as well as other conductive components may have a resistivity of less than about $10^{-3}$ Ohm/square or, more specifically, less than about $10^{-6}$ Ohm/square. Overall, one having ordinary skills in the art would understand the characteristics of the electrically insulating materials and the electrically conductive materials for applications described in this disclosure. The two or more bus bars electrically interconnect the plurality of electrochemical cells within the battery pack. For example, the two or more bus bars may be electrically connected to the first terminal and the second terminal of each of the plurality of electrochemical cells such that any of the two or more bus bars does not electrically short any of the plurality of electrochemical cells. In other words, any of the bus bars is not directly connected to the first terminal and the second terminal of the same electrochemical cell. In some embodiments, each of the two or more bus bars is electrically connected to two terminals of different cells of the plurality of electrochemical cells thereby electrically interconnecting the plurality of electrochemical cells within the battery pack. For example, each of the two or more bus bars is electrically connected to (i) the first terminal of one cell of the plurality of electrochemical cells and to the first terminal of another cell of the plurality of electrochemical cells, to (ii) the second terminal of one cell of the plurality of electrochemical cells and to second terminal of another cell of the plurality of electrochemical cells, or to (iii) the first terminal of one cell of the plurality of electrochemical cells and to the second terminal of another cell of the plurality of electrochemical cells. In some embodiments, each the two or more bus bars is electrically connected to the first terminal and optionally the second terminal of different electrochemical cells in the plurality of electrochemical cells without electrically shorting these electrochemical cells.

In some examples, the thermally conductive (and electrically nonconductive) materials described herein include plastics, polymer, rubbers, as well as polymers or rubbers that are filled with ceramics (e.g., $Al_2O_3$, boron nitride, aluminum nitride). In some examples, the electrically insulating materials set forth herein include engineering polymers, polyphenylene sulfide, nylon, or polycarbonate.

The interface module extends over all electrochemical cells in the battery pack. In some embodiments, the surface of the interface module facing away from the electrochemical cells is substantially insulating. For example, the base may form the top surface of the interface module. The interface module is operable as a cover of the battery pack.

In some embodiments, the first terminal and the second terminal of each electrochemical cell are disposed on the same side of the electrochemical cell. This side of the electrochemical cells also faces the interface module. For example, each of the plurality of electrochemical cells may include a top cover supporting the first terminal and the second terminal. The first terminal and the second terminal have opposite polarities and are electrically insulated from each other. For example, the first terminal may be a positive terminal, while the second terminal may be a negative terminal, or vice versa.

In some embodiments, the electrically insulating material of the base is thermally conductive. For purposes of this disclosure, the thermally conductive material is defined as a material that has a thermal conductivity of at least 0.1 W/m °C. Some examples of suitable material for the base include a thermally conductive ceramic or a polymer having filler.

In some embodiments, the interface module also includes a connecting portion having multiple connecting leads. Each bus bar has a separate electrical connection to one of the multiple connecting leads. Specifically, each bus bar may be electrically connected to one of the multiple connecting leads using one of voltage sense leads. Each voltage sense lead extends between the bus bars and the connecting lead, which this voltage sense lead interconnects. As such, each connecting lead may be connected to a different bus bar. It should be noted that the connecting portion may include additional connecting leads that may not be electrically connected to any of the bus bars. These additional connecting leads may be connected to thermistors or some other devices of the battery pack.

In some embodiments, the thickness of the voltage sense leads and the thickness of the two or more bus bars are substantially the same. Furthermore, the voltage sense leads may be substantially coplanar with the two or more bus bars. For example, if the thickness of the interface module is defined by the bus bars, then the voltage sense leads may be positioned within the boundaries defined by this thickness or extend beyond this boundary by less than 50% of the thickness.

In some embodiments, each of the two or more bus bars forms a monolithic structure with the one of the multiple voltage sense lead. Specifically, each bus bar and a voltage sense lead that interconnects this bus bar with a connecting lead of the connecting portion may be formed from the same sheet of metal. Other bus bars and voltage sense leads of the same interface module may be also formed from the same sheet but each pair of bus bar and connecting lead may be disjoined from each other pair during stamping.

In some embodiments, each of the two or more bus bars forms a monolithic structure with the one of the multiple voltage sense lead. Specifically, each bus bar and a voltage sense lead that interconnects this bus bar with a connecting lead of the connecting portion may be cut from the same sheet of metal. Other bus bars and voltage sense leads of the same interface module may be also formed from the same sheet but each pair of bus bar and connecting lead may be disjoined from each other pair during stamping.

In some embodiments, the battery pack also comprises a control module connected to the connecting leads of the connecting portion. The control module may be configured to control external electrical connections to each bus bar and, in some embodiments, may individually connect and/disconnect each bus bar from components external to the battery pack. For example, when the control module receives a signal representing a particular condition, e.g., a voltage being outside of a certain voltage range and/or a temperature being outside of a certain temperature range, the control module may disconnect one or all of the bus bars from the external components. In some embodiments, the control module may connected to the connecting leads of the connecting portion and sense voltage and/or resistance between various pairs of the connecting leads. The control module may be supported on an end frame of the battery pack and extends substantially normal to the interface module. As used herein, substantially normal includes a 90° angle or a deviation therefrom by less than about 1%, 5%, 10%, or 20%.

In some embodiments, the interface module also comprises a thermistor module having multiple thermistors. The thermistors may be positioned at different locations of the interface module. For example, each thermistor may be positioned on a different bus bar. Furthermore, each thermistor may have a separate electrical connection to one of the connecting leads. These electrical connections may be coplanar to the bus bars.

In some embodiments, the base of the interface module comprises spacing members protruding in between the first terminal and the second terminal of each electrochemical cell. These spacing members may come in contact with the electrochemical cells, e.g., with the top cover, and may be used for heat transfer and/or electrical isolation of different conductive components.

In some embodiments, the battery pack also comprises a thermal control module thermally coupled to the interface module. As used herein, thermally coupled means that the thermal control module and the interface module has low restriction to heat transfer between these components. For example, the thermal control module and the interface module may have a direct physical contact or have a highly thermally conductive materials disposed in between. The thermal control module may comprise a heat exchanger having one or more manifolds for transporting heat carrying fluid. The fluid may be circulated through the heat exchanger using one or more external pumps. The flow of the fluid may be controlled by the control module and may be based on the temperature of the bus bars, for example.

In some embodiments, the bus bars are electrically connected to the first terminal and the second terminal of each of the plurality of electrochemical cells using flexible connectors. Specifically, the flexible connectors allow the two or more bus bars to move with respect to the first terminal and the second terminal of each electrochemical cell while maintaining the two or more bus bars electrically connected to the first terminal, the second terminal, or both the first terminal and the second terminal of each of the plurality of electrochemical cells. This flexibility may be needed to accommodate swelling of the electrochemical cells during their cycling, thermal expansion of different components, and other reasons. For example, the flexible connectors may be formed from flexible tabs or flexible conductive adhesive.

In some embodiments, the base of the interface module may be flexible such that it allows the bus bars to move with respect to each other during operation of the battery pack. As noted above, the flexibility may be used to accommodate swelling of the electrochemical cells during their cycling and/or thermal expansion of different components, for example.

In some embodiments, the two or more bus bars are electrically connected to the first terminal and the second terminal such that any of the two or more bus bars does not electrically short any of the plurality of electrochemical cells.

Also provided is an interface module, which comprises two or more bus bars and a base. The interface module has a substantially planar shape. Each of the two or more bus bars comprises an electrically conductive material. The base comprises an electrically insulating material. The base mechanically supports the two or more bus bars. The two or more bus bars to electrically interconnect the plurality of electrochemical cells in a battery pack. The two or more bus bars are arranged in such a way that when the two or more bus bars are electrically connected to the first terminal and the second terminal of each of the plurality of electrochemical cells in an assembled battery pack, none of the two or more bus bars electrically shorts any of the plurality of electrochemical cells. Each of the two or more bus bars may be electrically connected to two terminals of different cells of the plurality of electrochemical cells thereby electrically interconnecting the plurality of electrochemical cells within the battery pack. Specifically, each of the two or more bus bars is electrically connected to (i) the first terminal of one cell of the plurality of electrochemical cells and to the first terminal of another cell of the plurality of electrochemical cells, to (ii) the second terminal of one cell of the plurality of electrochemical cells and to second terminal of another cell of the plurality of electrochemical cells, or to (iii) the first terminal of one cell of the plurality of electrochemical cells and to the second terminal of another cell of the plurality of electrochemical cells.

These and other embodiments are described further below with reference to the figures.

DETAILED DESCRIPTION OF EXAMPLE EMBODIMENTS

Figure 1:
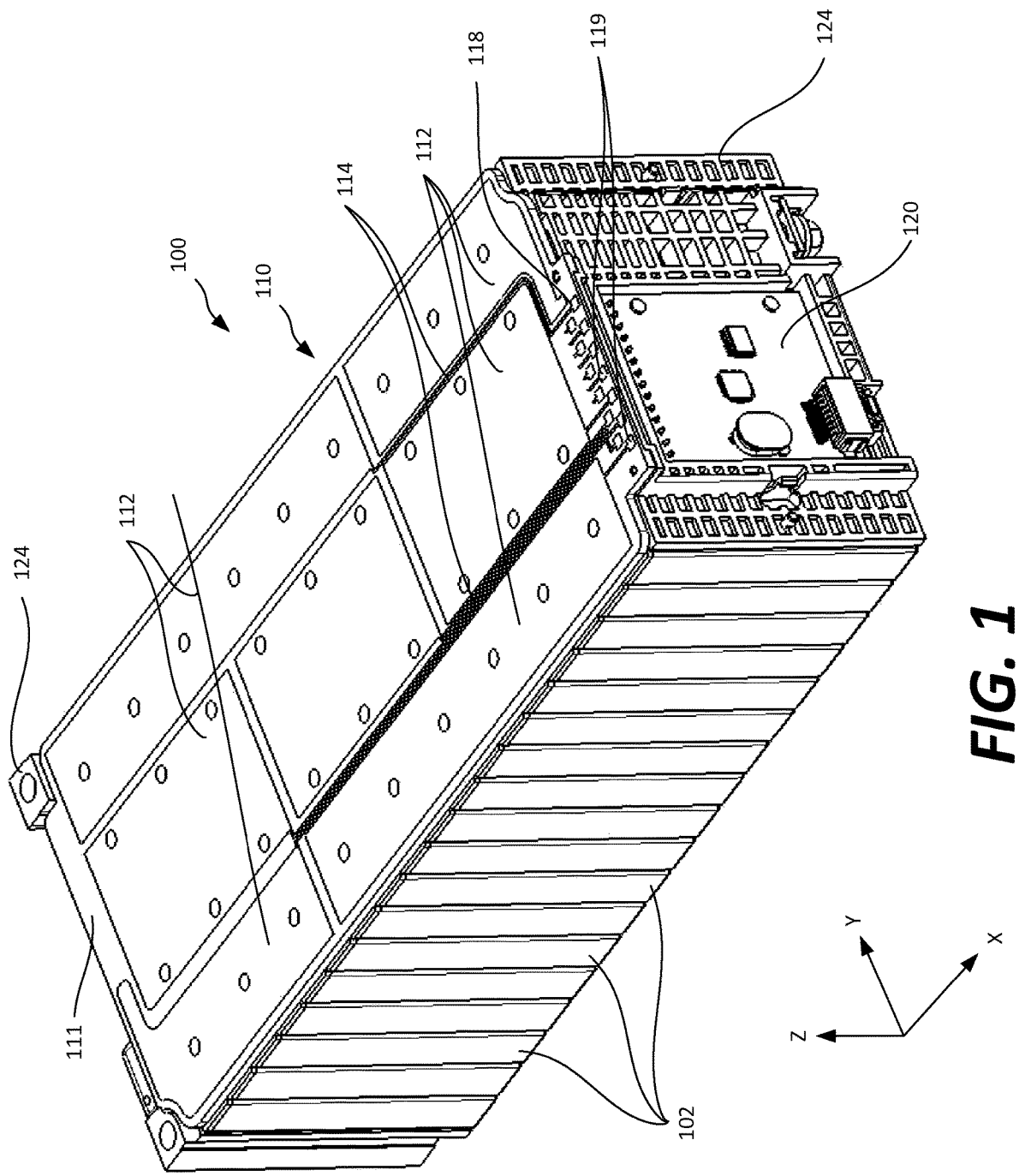
FIG. 1 is a schematic isometric view of a battery pack having an interface module interconnecting electrochemical cells and connected to a control module positioned on an end frame, in accordance with some embodiments.
Figure 2:
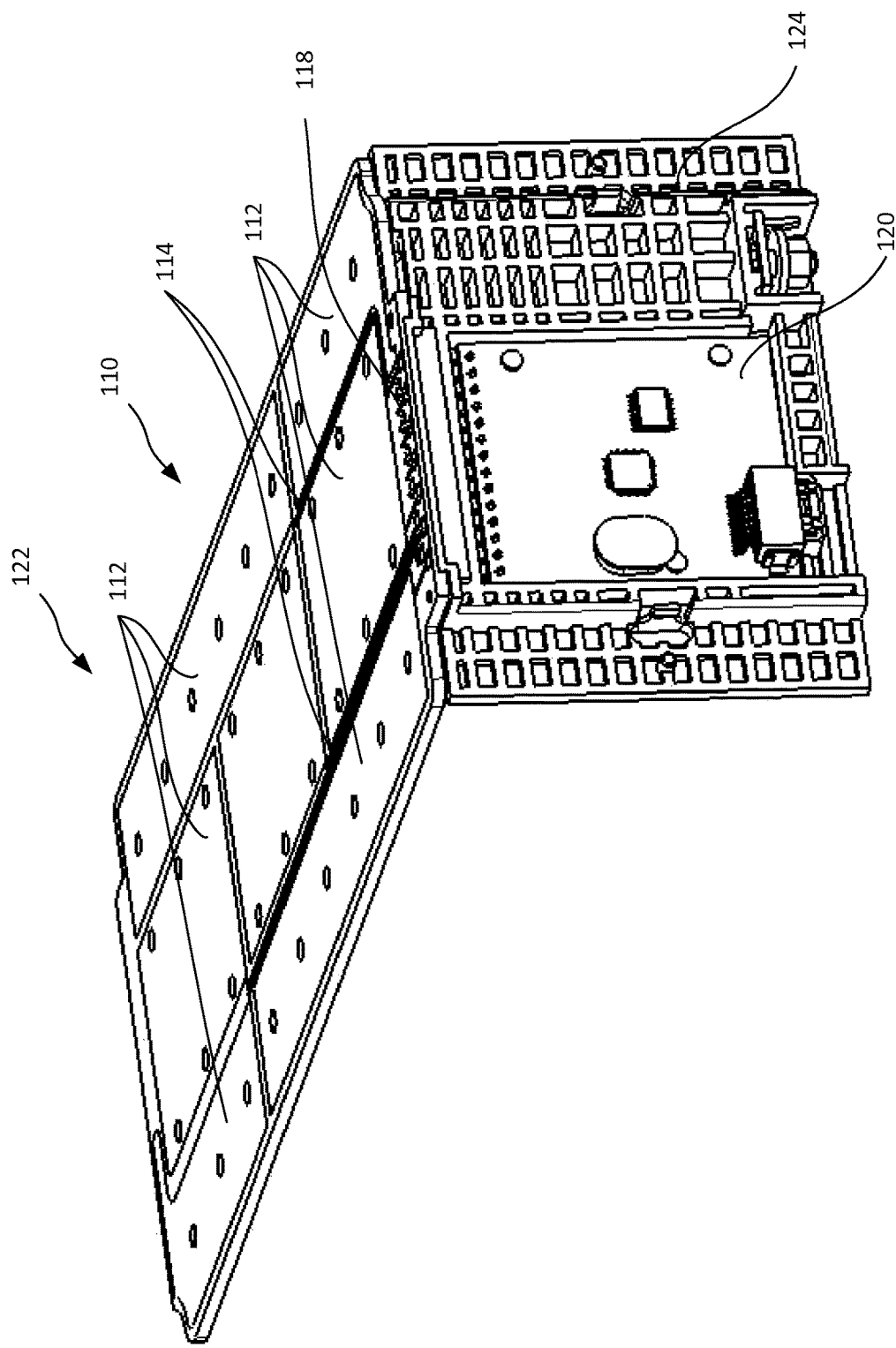
FIG. 2 is a schematic isometric view of an assembly having the interface module connected to the control module positioned on the end frame, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

Conventional battery packs for use in vehicles and other applications often suffer from poor reliability because of complexities associated with electrical connections and thermal management systems. The battery packs can be very expensive to make and have large size and weight limiting their applications and adoption. Furthermore, conventional battery packs can be unsafe. One particular area of concern is thermal management. Many types of electrochemical cells have a low temperature operating threshold, which is often around 0° C. or sometimes around −30° C. This limitation often requires heating of electrochemical cells within battery packs that are placed in cold environments or optionally to improve performance characteristics. Complex thermal management systems are often used for such heating. Similarly, most electrochemical cells have high temperature operating thresholds. Exceeding these thresholds may cause electrode and/or electrolyte degradation, separator shut down, and potentially unsafe conditions (e.g., thermal runaway). As such, in addition to interconnecting electrochemical cells within a battery pack, the temperature in the battery pack needs to be controlled.

Provided are interface modules for electrically interconnecting electrochemical cells within battery packs as well as thermal management with these packs. It will be understood by one having ordinary skills in the art that an interface module interconnects electrochemical cells of a battery pack without electrically shorting any of these cells. These modules may directly interface the electrochemical cells and may be referred to as interface modules. The interface modules may form electrical connections with terminals of the electrochemical cells and may be thermally coupled to the side of the electrochemical cells that contain these terminals. The thermal management of the interface modules may involve redistributing heat within the battery packs, such that the heat can be transferred from one electrochemical cell to another cell and/or other components. In some embodiments, the interface module may be coupled to the thermal control module. In these embodiments, the thermal management may also involve adding or removing heat from the battery packs by, for example, recirculating heating fluid or other means.

In some embodiments, the electrochemical cells of a battery pack are stacked prismatic cells. Specifically, each electrochemical cell may include a stack of one or more positive electrodes and one or more negative electrodes, sometimes referred to as cathodes and anodes. Each electrode may include an active material layer disposed on a surface of a current collector. The current collector is electrically coupled to its terminals of the electrochemical cell. The current collectors may be made from aluminum, copper, and other like materials, which generally have a good in-plane thermal conductivity in comparison to other materials of the electrochemical cells, such as active material layers, separator, and electrolyte. It should be also noted that the current collectors of all electrodes within the same electrochemical cell generally extend along at least one direction (for a wound cell or two for a stacked cell). This direction may be referred to a thermally conductive direction. When multiple cells are positioned within a pack, all thermally conductive directions of these cells are typically parallel to each other.

Alternatively, the electrochemical cells of a battery pack may be wound cells, such as cylindrical cells or wound prismatic cells. Specifically, each electrochemical cell may include a positive electrode and a negative electrode wound together in a "jellyroll." The design of the electrodes may be similar to ones in a stacked electrochemical cell, but the electrodes are generally much longer in one direction (i.e., the winding direction). In a prismatic wound cell, the longer side of the wound may be referred to a thermally conductive direction. When multiple cells are positioned within a pack, all thermally conductive directions of these cells are typically parallel to each other.

Conventional battery packs often rely on thermal heat transfer through side walls of the cells in these packs. While these side walls often provide larger surfaces for heat transfer than, e.g., the top covers, the side walls may extend in the direction substantially parallel to the thermally conductive direction. As such, the heat transfer within the electrochemical cells to these side walls may be less than, e.g., to the top covers.

The thermal transfer coefficients in the direction parallel to the substrate sheet can be about a factor of 30 different from the thermal transfer coefficients in the direction orthogonal to the substrate sheet. In some examples, the direction orthogonal to sheets in cell, can have a thermal transfer coefficient of approximately 1 W/mK (watt per meter-Kelvin). In some examples, the direction parallel to sheets in cell, can have a thermal transfer coefficient of approximately 30-50 W/mK (Watt per meter-Kelvin).

In some embodiments, the interface module extends within a plane substantially orthogonal to the thermally conductive directions of the cells within the battery pack. More specifically, the interface module extends within a plane substantially orthogonal to the current collecting substrates within the electrochemical cells. As such, the interface module may be disposed over and, in some embodiments, in contact with top covers of the electrochemical cells of the same battery pack. For example, the electrochemical cells may have both connection terminals positioned on their top covers. The interface module may extend parallel to these top covers and may be electrically interconnected with each of these terminals according to a certain interconnection scheme within the pack. The interconnection scheme depends on the size and shape of bus bars of the interface modules as well as on size and location of the terminals in the top covers of the electrochemical cells. For example, each cell in a pack may have a first terminal and a second terminal such that the first terminal has a different polarity than the second terminal. Each bus bar may be electrically connected to (i) the first terminal of one cell and to the first terminal of another cell, to (ii) the second terminal of one cell and to second terminal of another cell, or to (iii) the first terminal of one cell and to the second terminal of another cell. When a bus bar interconnects three or more cells, it may be connected to (i) the first terminals of three cells, to (ii) the second terminals of three cells, to (iii) the first terminals of two cells and to the second terminal of another cell, or to (iv) the second terminals of two cells and to the first terminal of another cell. Overall, one having ordinary skills in the art would understand various interconnection schemes that can be achieved with bus bars.

The interface module may be thermally coupled to the top covers and transfer heat to and from the cells through these covers. The interface module may be in direct contact with each top cover. In some embodiments, a thermally conductive material (e.g., an encapsulant) may be disposed between the top covers and the interface module to enhance the thermal conductivity of between the top covers and the interface module. While this disclosure generally refers to interface modules thermally coupled to top sides or, more specifically, to top covers of electrochemical cells, thermal coupling to bottom sides or, more specifically, to bottom covers or bottom portions of the case is also within the scope. It should be noted, however, that the position of interface modules may also be driven by the location of electrical terminals on the case.

In some embodiments, current collector substrates, their electrical connections to terminals and/or their thermal coupling to a top cover (or bottom cover) of an electrochemical cell may be configured to increase heat transfer coefficient within the cell in at least one direction, e.g., between the top cover and bottom of each electrochemical cell. In other words, various features may be used to increase the heat transfer coefficient within electrochemical cells within the thermally conductive direction. For example, an electrochemical cell may include an electrically insulating but thermally conductive material positioned between electrodes and top cover. A thicker current collector or a specially shaped current collector may be used. Furthermore, larger connector terminals and/or bulkier connections (e.g., weld nuggets) between the electrical terminals and current collector substrates may be provided. A large area weld, such as an ultrasonic weld, may be used between current collector substrates or their tabs and connector terminals to provide good thermal coupling.

Examples of Battery Pack Components

FIG. 1 is a schematic isometric view of battery pack 100 having interface module 110 interconnecting electrochemical cells 102, in accordance with some embodiments. Electrochemical cells 102 are shown arranged between two end frames 124. Battery pack 100 may also include control module 120 electrically connected to interface module 110. Control module 120 may be disposed on the side of battery pack 100 and attached, for example, to end frame 124. End frames 124 may include mounting elements that can be used to couple battery pack 100 to other structures, such as another battery pack or a car frame. Interface module 110 may be disposed over top surfaces 107 of electrochemical cells 102. As such, interface module 110 may be substantially orthogonal to end frames 124 and substantially orthogonal to control module 120.

Interface module 110 includes two or more bus bars 112 and base 111. Interface module 110 may also include connecting portion 118 for connecting to control module 120 as, for example, shown in FIG. 1 and further described with reference to FIG. 3. Connecting portion 118 includes multiple connecting leads 119, some of which may be individually connected to bus bars 112 using voltage sense leads 114. Some connecting leads 119 may be connected to a thermal module as further described below with reference to FIG. 5.

Each connecting lead 119 of connecting portion 118 may be individually connected to control module 120 or, more specifically, to connecting pad 128 of control module 120. Control module 120 may control external electrical connections to each bus bar 112. For example, when control module 120 receives a signal representing a particular condition, e.g., exceeding or dropping below a certain voltage threshold between bus bars 112 and/or exceeding or dropping below a temperature threshold at particular bus bar 112, control module 120 may disconnect one or more bus bars 112 from external components, such as a generator or an electrical motor. In some embodiments, control module 120 is configured to send signals to external components, such as relays, that are responsible for forming or breaking electrical connections to individual bus bars 112.

Control module 120 may be referred to as cell sense circuit (CSC), as it provides sensing functions (e.g., voltage and/or temperature sensing). It is understood that control module 120 may provide additional functions, such as battery management functions. Through connecting leads 119 of connecting portion 118, control module 120 is connected to voltage sense leads 114 and, in some embodiments, thermistors 142 (of thermistor module 140 further described below with reference to FIGS. 5 and 6).

Figure 3:
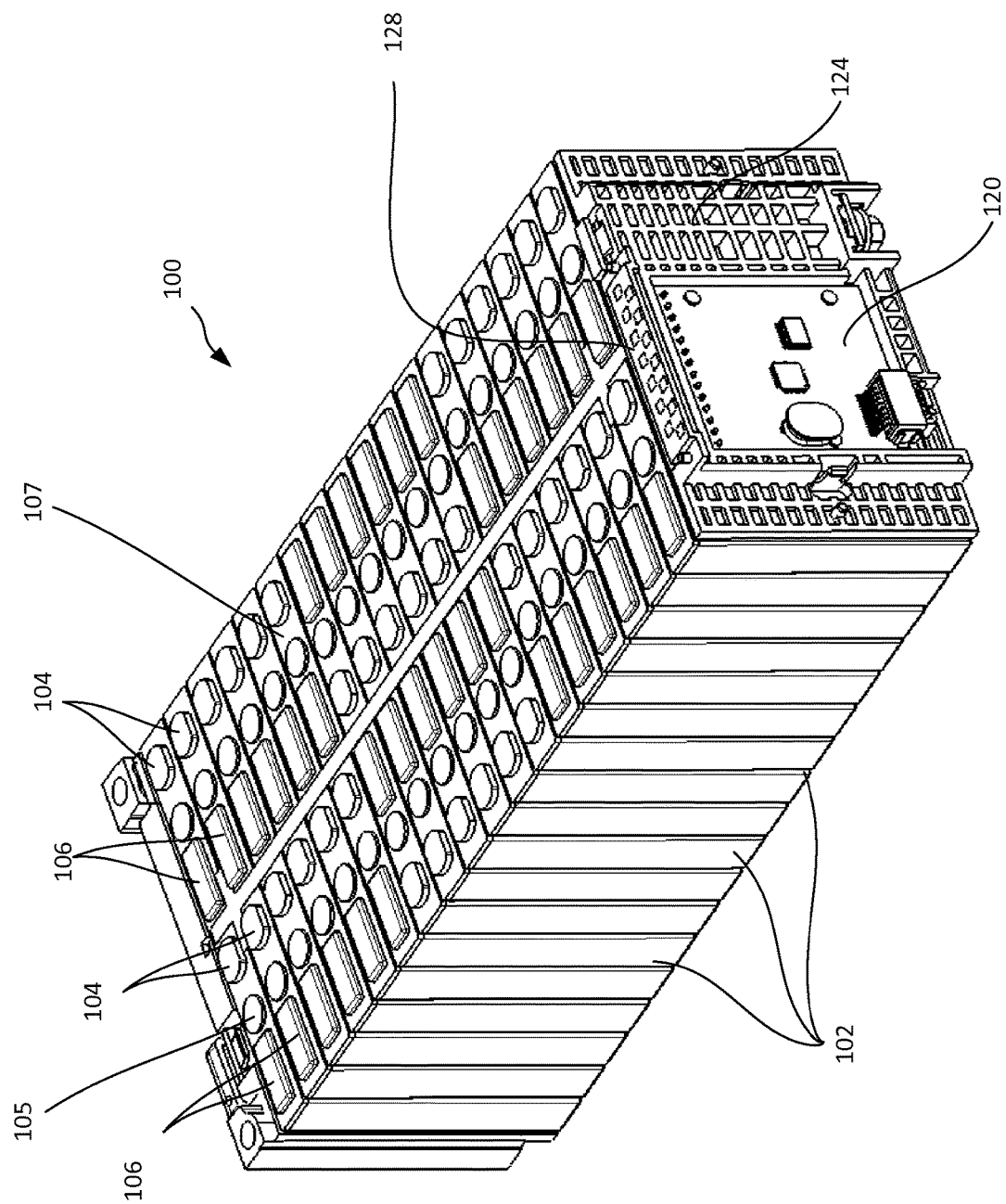
FIG. 3 is a schematic isometric view of the battery pack with the interface module removed to illustrate the terminals of the electrochemical cells, in accordance with some embodiments.
Figure 4:
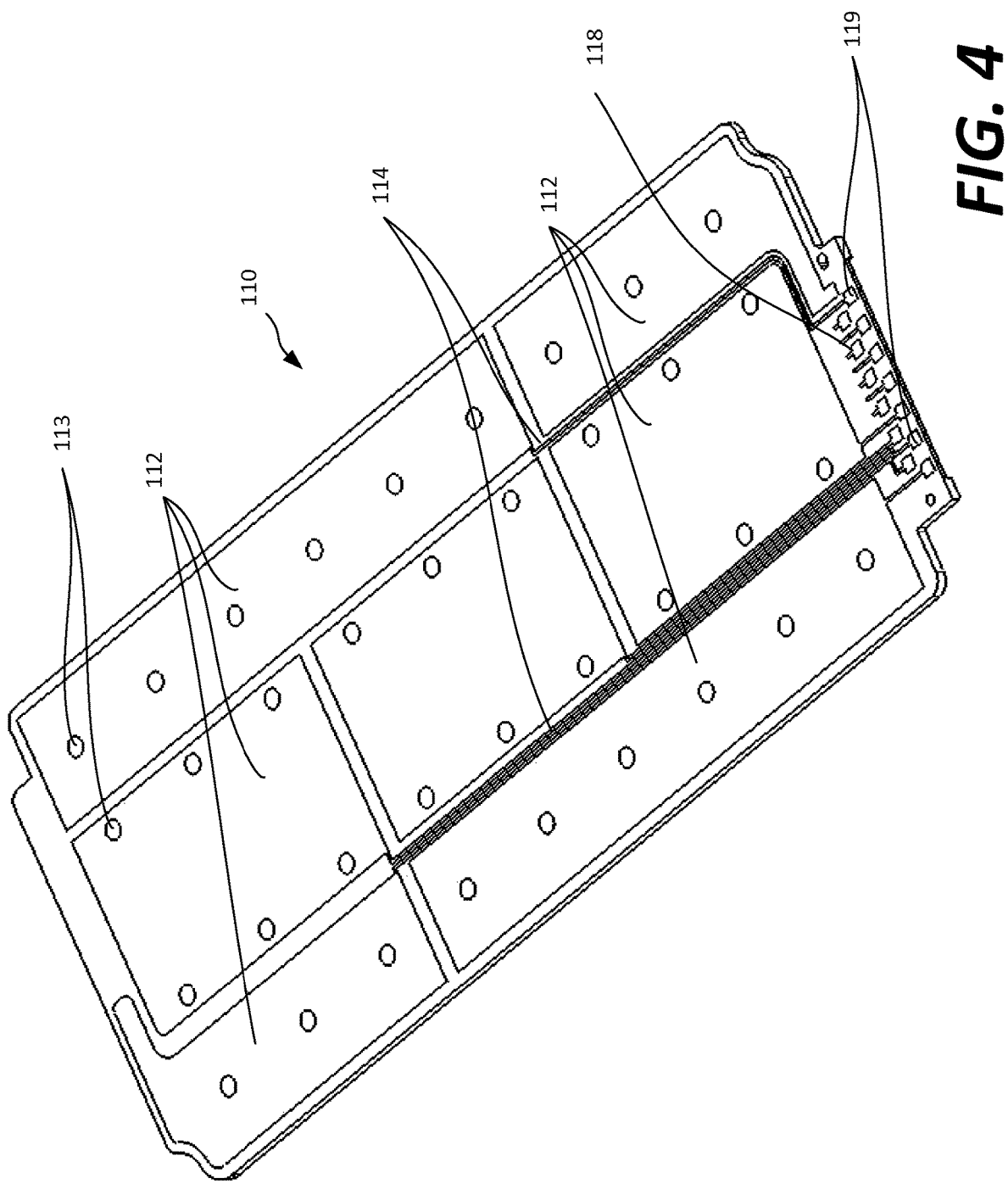
FIG. 4 is a top isometric view of the interface module illustrating bus bars, voltage sense leads, and connecting portion, in accordance with some embodiments.

As shown in FIG. 3, control module 120 may have connecting pad 128 for forming connection with connecting leads 119 of connecting portion 118. Connecting pad 128 may be physically coupled to end frame 124. Furthermore, connecting pad 128 may be electrically coupled to various components of control module 120.

Figure 9:
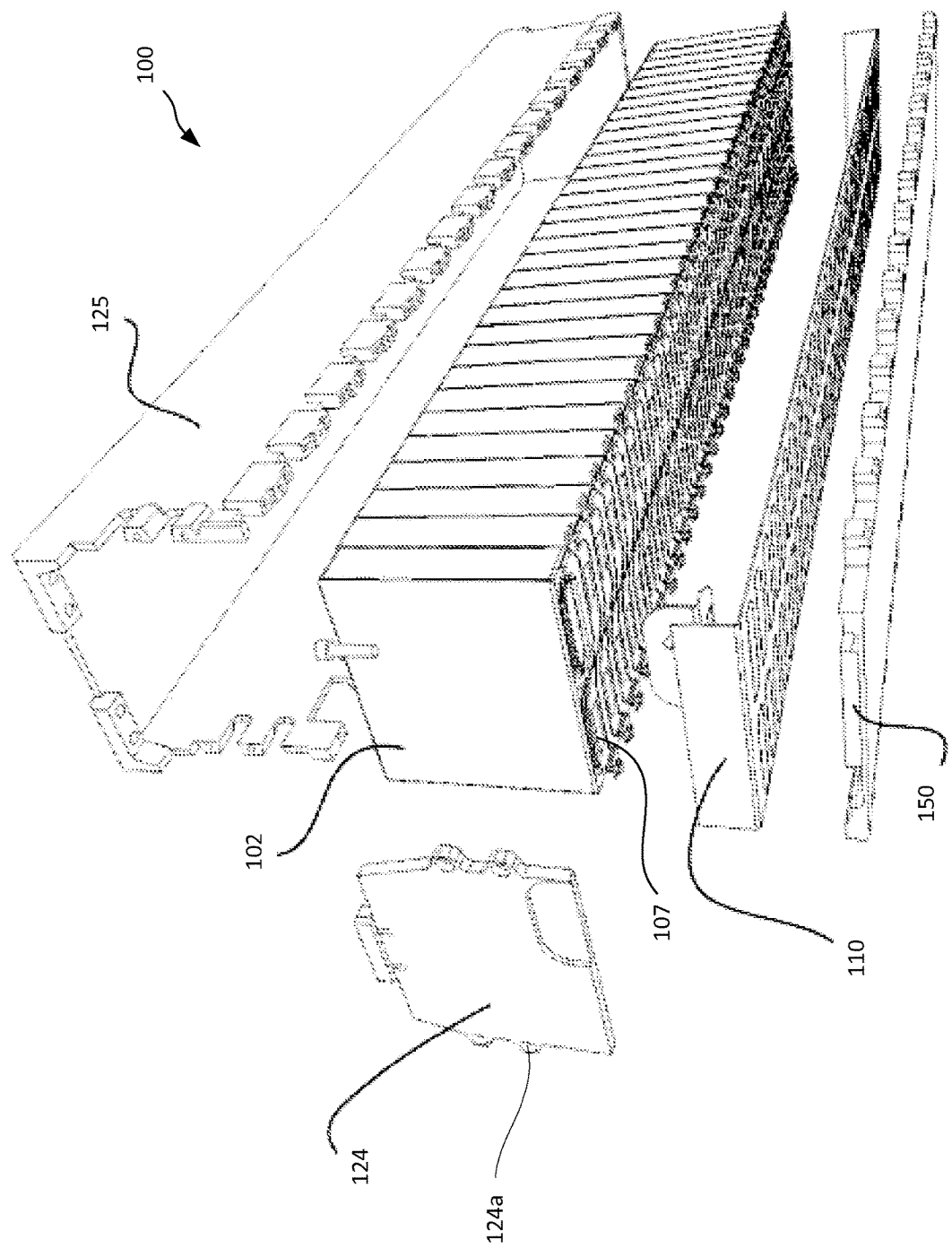
FIG. 9 is a schematic expanded view of the battery pack illustrating the thermal control module and interface module as well as the end frame and housing member, in accordance with some embodiments.

In some embodiments, battery pack 100 may include additional components that form an enclosure and/or adding with thermal management. FIG. 9 is a schematic expanded view of battery pack 100 illustrating thermal control module 150 and interface module 110, in accordance with some embodiments. Thermal control module 150 and interface module 110 may be both used for thermal management of battery pack 100 as further described below.

FIG. 9 also illustrates end frame 124 and housing member 125 of battery pack 100. In this example, end frame 124, housing member 125, and thermal control module 150 form an exterior surface of battery pack 100. Alternatively, if thermal control module 150 is not used or positioned in another location within a battery pack, then interface module 110 may be a part of the exterior surface of battery pack 100. As such, either thermal control module 150 or interface module 110 may form an enclosure of battery pack 100 together with end frame 124 and housing member 125. This enclosure may seal and protect electrochemical cells 102 and other components of battery pack 100 from moisture and other environmental elements. The enclosure also provides mounting for battery pack. For example, the enclosure may include screwing holes, such as holes 124a on end frame 124.

Figure 10:
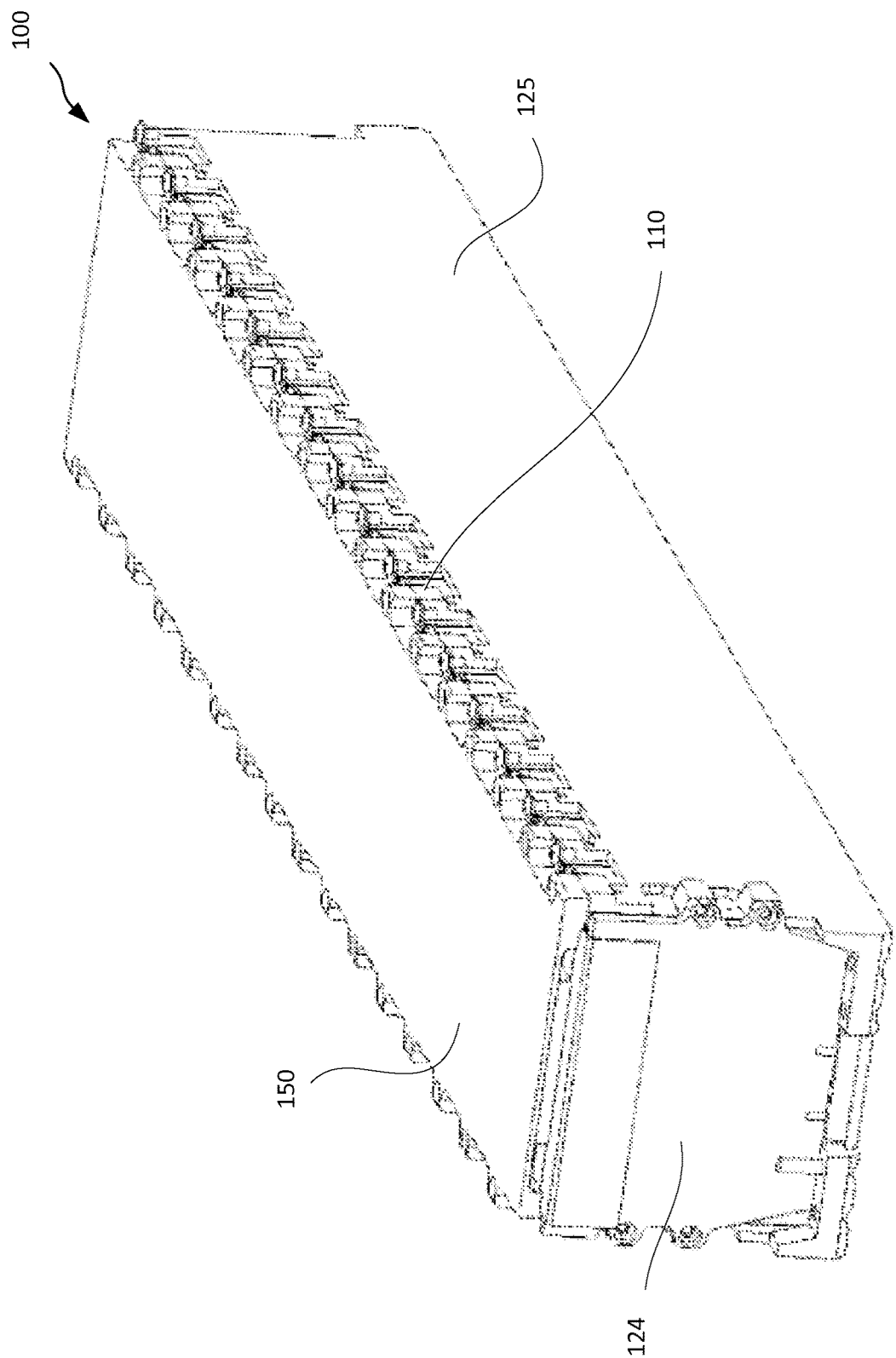
FIG. 10 is a schematic view of the assembled battery pack illustrating the housing member, end frame, and thermal control module forming exterior surfaces of the battery pack, in accordance with some embodiments.

In some embodiments, end frame 124 and/or housing member 125 may be formed from thermally insulating materials to prevent heat transfer form one battery pack to another battery pack. For example, when one battery pack is overheated, adjacent battery packs are not overheated as well. Instead, the heat is removed from the overheated pack using thermal control module 150 and/or interface module 110. It should be noted that surfaces of electrochemical cells 102 facing interface module 110 are referred to top surface 107 even though battery pack 100 in FIG. 9 is shown upside down. FIG. 10 is a schematic view of battery pack 100 also shown in FIG. 9 in the assembled state.

Figure 7:
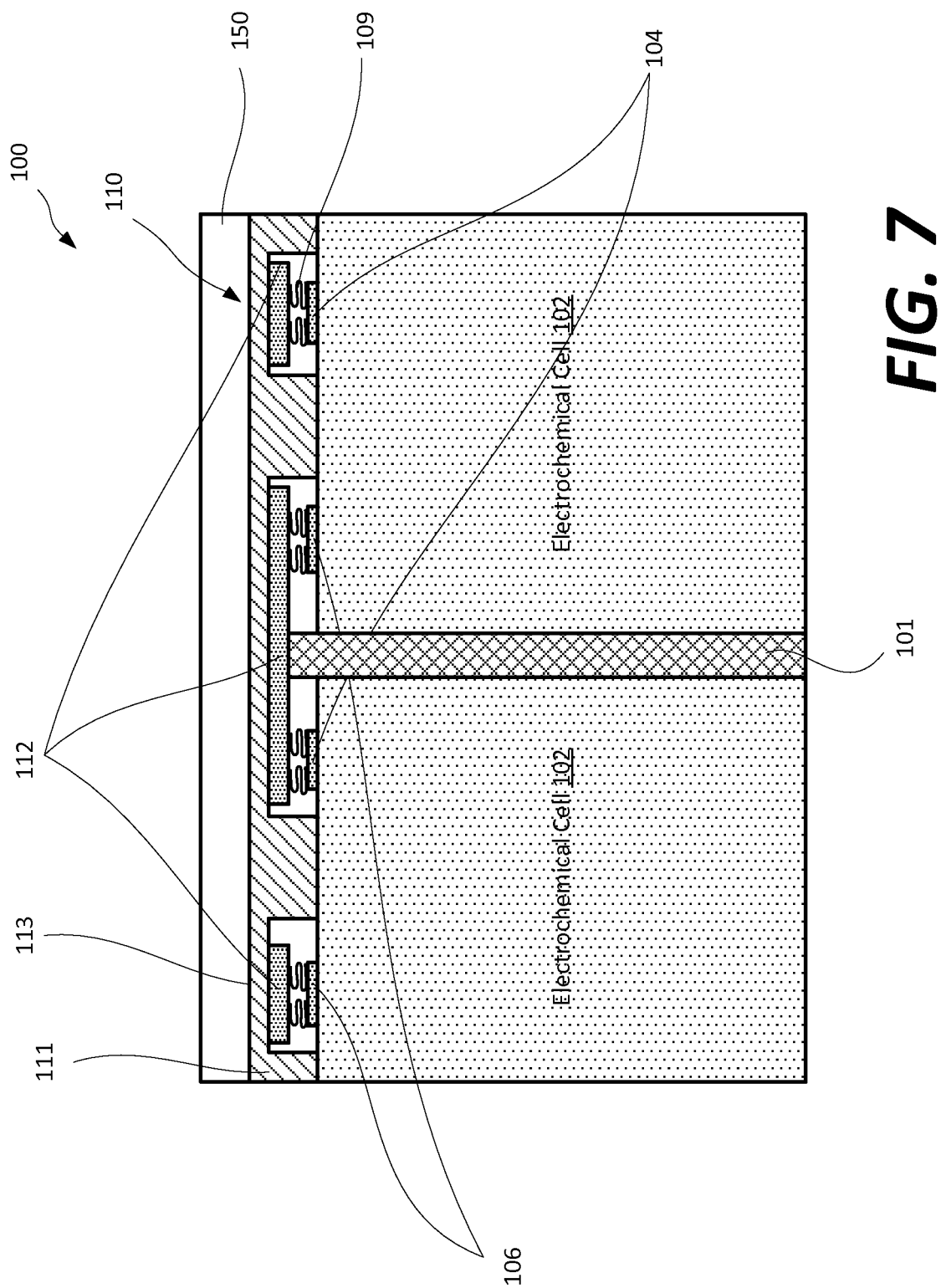
FIG. 7 is a schematic side cross-sectional view of the battery pack having a thermal control module and interface module stacked over electrochemical cells, in accordance with some embodiments.

In some embodiments, electrochemical cells 102 are spaced from one another and spacing elements 101 are disposed between each pair of adjacent cells 102 as, for example, shown in FIG. 7. Spacing elements 101 may be used to accommodate volume changes within electrochemical cells 102 during their cycling and providing support to electrochemical cells 102, in particular, when electrochemical cells 102 are shrunk during cycling. Spacing elements 101 may be made from various types of flexible materials, such as foam, elastic materials, and the like. When electrochemical cells 102 in battery pack 100 expand, spacing elements 101 disposed between electrochemical cells 102 compress and absorb the volume expansion of electrochemical cells 102. At the same time, when electrochemical cells 102 contract, spacing elements 101 expand and help electrochemical cells 102 to return to their original shape and volume. Spacing elements 101 may be configured to continuously contact side walls of electrochemical cells 102 and exert some pressure onto electrochemical cells 102 even when electrochemical cells 102 are contracted. Without being restricted to any particular theory, it is believed that exerting some pressure onto electrochemical cells may help to maintain good ionic mobility and electronic conductivity within the cells.

In some embodiments, spacing elements 101 may be used to thermal insulate adjacent electrochemical cells 102 thereby preventing heat transfer from one cell 102 to another cell 102 and instead direct the heat to interface module 110. As such, when one electrochemical cell 102 experiences overheating adjacent cells are protected. As used herein, the interface module provides a low thermal resistance path to a series or collection of several cells while the spacing elements 101 provide a high thermal resistance path to any one or two particular cells (e.g., the cells immediately adjacent to a given cell that may have a high temperature than all other cells). In some embodiments, spacing elements 101 have a low thermal conductivity through the thickness of spacing elements 101 (e.g., between two adjacent electrochemical cells 102) but a high thermal conductivity along the height of spacing elements 101 (e.g., in the direction substantially orthogonal to interface module 110). In some embodiments, spacing elements 101 extends to and directly interfaces interface module 110.

In some examples, if one particular cell heats up to a temperature greater than all other cells, the interface module (110) allows for heat distribution between many other cells. At the same time, the spacing elements 101 prevent the heat originating from this one particular cell to be specifically (or only) transferred to one or two other specific cells (e.g., an adjacent cell).

Examples of Interface Module Components and Features

Interface module 110 has a substantially planar shape. FIG. 1 illustrates interface module 110 extending within the X-Y plane. Specifically, the thickness of interface module 110 (in the Z direction) may be at least about five times smaller than each of the length (in the X direction) and width (in the Y direction) of interface module 110 or even at least about ten times smaller. The substantially planar shape may be formed by stamping most, if not all, of conductive components, e.g., bus bars 112 and voltage sense leads 114 from the same sheet of metal. These components may be supported by base 111, which may be molded over the conductive components.

In some embodiments, interface module 110 has a thickness of less than about 10 millimeters, or less than about 9 mm, less than about 8 mm, less than about 7 mm, less than about 6 mm, less than about 5 mm, less than about 4 mm, less than about 3 mm, less than about 2 mm, or less than about 1 mm. Such a small thickness provides more space for electrochemical cells in the same battery pack size (than bulkier interconnects), which potentially result in a larger capacity battery pack. In general, the volume and weight of all components of a battery pack (excluding active electrode materials) need to be minimized, while retaining performance characteristics of the pack. In some examples, the interface module 110 has a thickness of less than about 9 mm. In some examples, the interface module 110 has a thickness of less than about 8 mm. In some examples, the interface module 110 has a thickness of less than about 7 mm. In some examples, the interface module 110 has a thickness of less than about 6 mm. In some examples, the interface module 110 has a thickness of less than about 5 mm. In some examples, the interface module 110 has a thickness of less than about 4 mm. In some examples, the interface module 110 has a thickness of less than about 3 mm. In some examples, the interface module 110 has a thickness of less than about 2 mm. In some examples, the interface module 110 has a thickness of less than about 1 mm.

In some embodiments, interface module 110 has a thickness of about 10 millimeters or about 9 mm, about 8 mm, about 7 mm, about 6 mm, about 5 mm, about 4 mm, about 3 mm, about 2 mm, or about 1 mm. In some embodiments, interface module 110 has a thickness of about 10 millimeters. In some examples, the interface module 110 has a thickness of about 9 mm. In some examples, the interface module 110 has a thickness of about 8 mm. In some examples, the interface module 110 has a thickness of about 7 mm. In some examples, the interface module 110 has a thickness of about 6 mm. In some examples, the interface module 110 has a thickness of about 5 mm. In some examples, the interface module 110 has a thickness of about 4 mm. In some examples, the interface module 110 has a thickness of about 3 mm. In some examples, the interface module 110 has a thickness of about 2 mm. In some examples, the interface module 110 has a thickness of about 1 mm. Such a small thickness provides more space for electrochemical cells in the same battery pack size (than bulkier interconnects), which potentially result in a larger capacity battery pack. In general, the volume and weight of all components of a battery pack (excluding active electrode materials) need to be minimized, while retaining performance characteristics of the pack.

Figure 12:
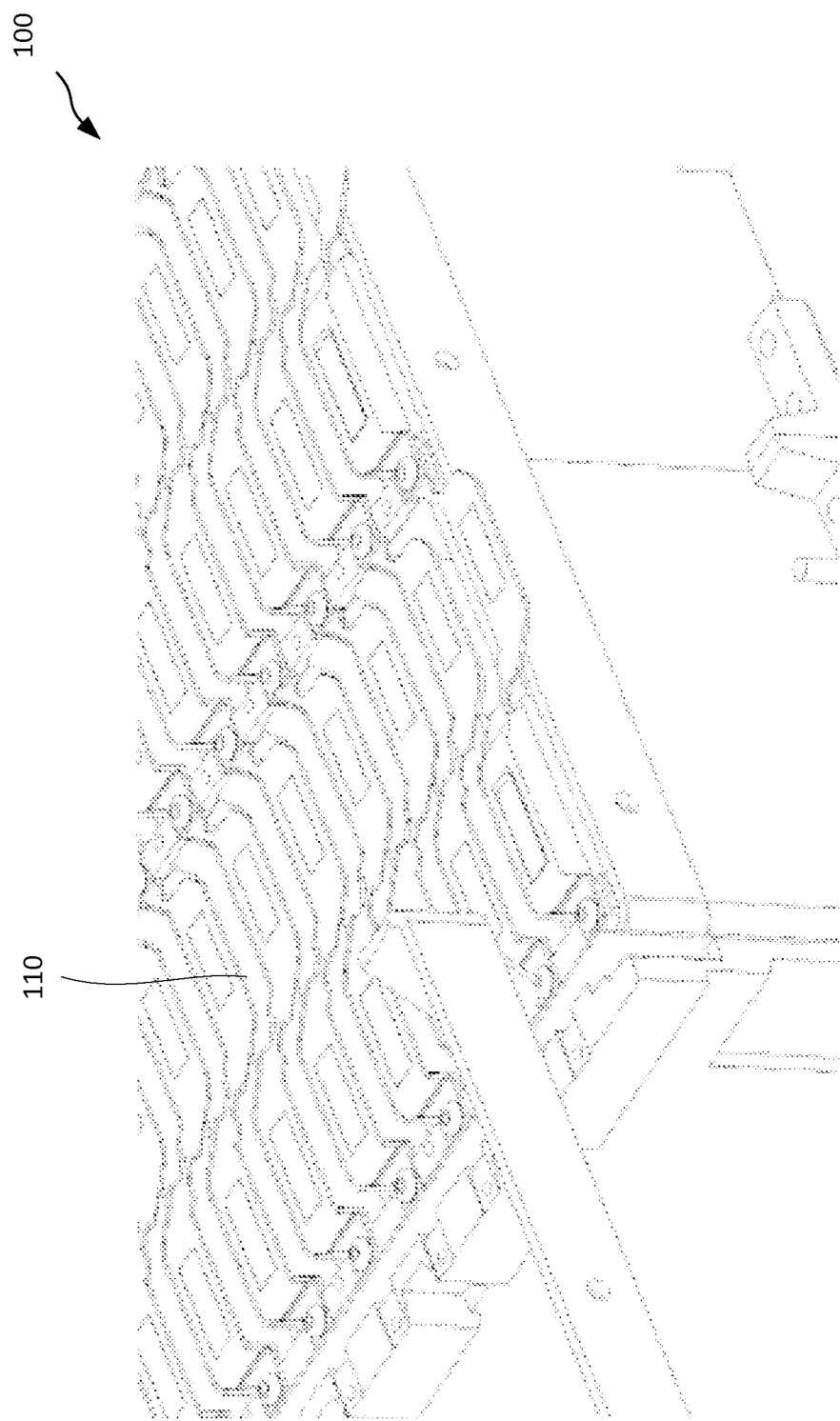
FIG. 12 is a schematic top view of a portion of the battery pack illustrating the interface module conformally covering the top surfaces of the electrochemical cells in the battery pack, in accordance with some embodiments.
Figure 13:
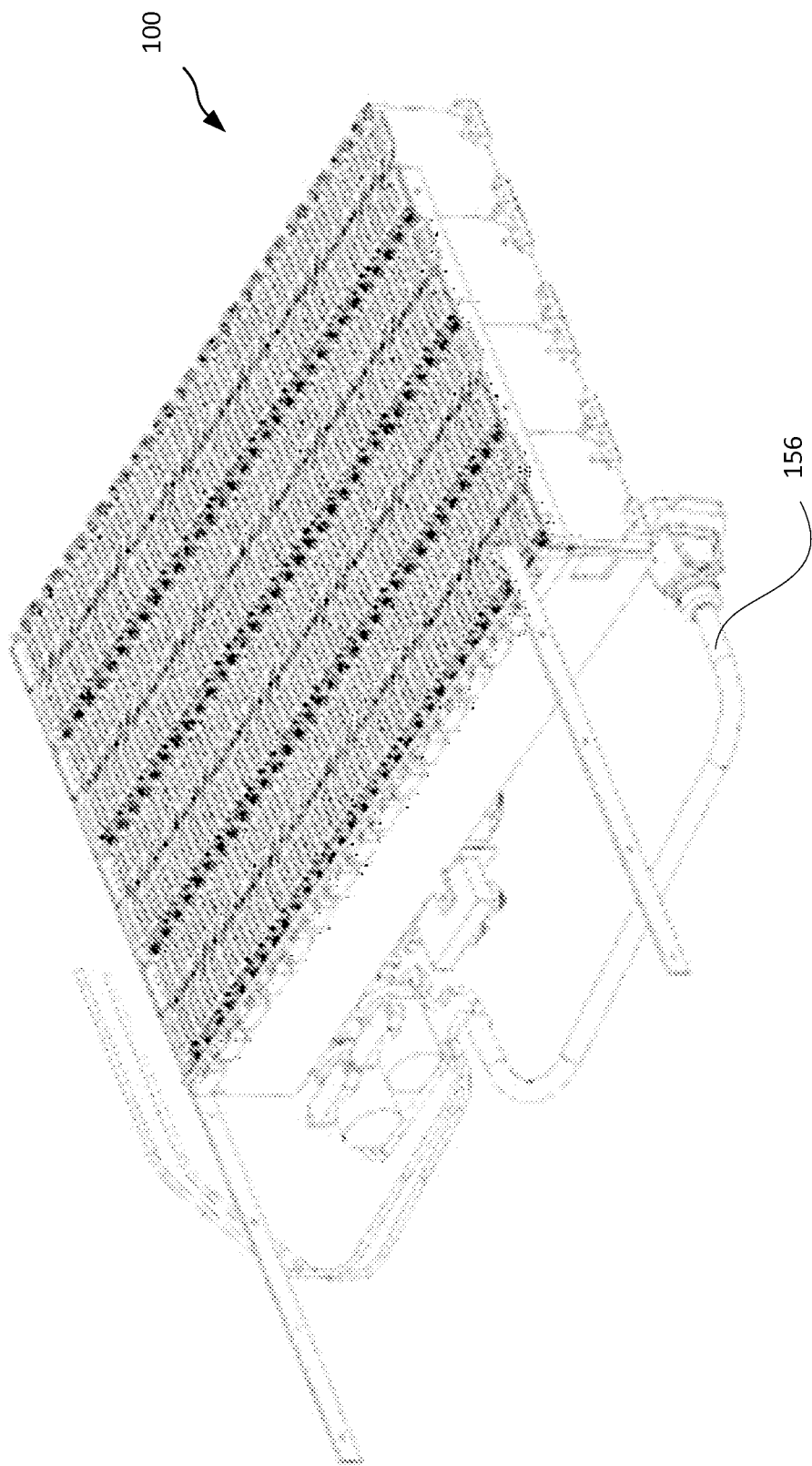
FIG. 13 is a schematic top view of the battery pack, in accordance with some embodiments.

The plane of interface module 110 may be substantially parallel to top surfaces 107 of electrochemical cells 102 more clearly shown in FIG. 3. In some embodiments, interface module 110 may be conformal to top surfaces 107 of the plurality of electrochemical cells 102 as, for example, shown in FIG. 12. Even though interface module 110 may be conformal to top surfaces 107, interface module 110 may still have a substantially planar shape. Specifically, the thickness of interface module 110 may accommodate topographical variations of top surfaces 107 of electrochemical cells 102, such as protruding first terminals 104 and second terminals 106.

In some embodiments, surface 113 of interface module 110 facing away from electrochemical cells 102 is substantially insulating. In other words, surface 113 may not conduct electricity. For purposes of this disclosure, "substantially insulating" is defined as having a volumetric resistivity of at least about $10^8$ Ohm/square. This surface 113 may be referred to as a top surface. One such example is shown in FIG. 7. Specifically, FIG. 7 is a schematic side view of battery pack 100 having interface module 110, in which base 111 forms top surface 113 of interface module 110. Since base 111 is made from an electrically insulating material, top surface 113 is also insulating.

In some embodiments, interface module 110 is operable as a cover of battery pack 100. For example, interface module 110 may seal electrochemical cells 102 within battery pack 100. In some embodiments, another component is disposed over interface module 110, such as thermal control module 150 as shown in FIG. 7 and further described below. In this case, interface module 110 is thermally coupled to thermal control module 150 to ensure heat transfer between thermal control module 150 and interface module 110. For example, top surface 113 of interface module 110 and bottom surface of thermal control module 150 may be mating surface. In some embodiments, a thermally conductive encapsulant is disposed between interface module 110 and bottom surface of thermal control module 150.

In some embodiments, interface module 110 has a thermal conductivity of between about 0.2 W/m-K and 200 W/m-K or, more specifically, between about 2 W/m-K and 100 W/m-K or, more specifically, between about 30 W/m-K and 50 W/m-K in a direction within the plane of interface module. The thermal conductivity depends on materials of interface module 110 or, more specifically, on materials of base 111 and bus bars 112. The thermal conductivity also depends on the size, shape, and geometry of these components. In some embodiments, the thermal conductivity of the material forming bus bars 112 may be greater than the thermal conductivity of the material forming base 111. In these embodiments, bus bars 112 may occupy at least about 25% of the cross-section area or, more specifically, at least about 50% of the cross-section area of interface module 110 in any direction within the plane defined by interface module 110. In some embodiments, both base 111 and bus bars 112 may be made from thermally conductive materials.

Interface module 110 may be physically attached to electrochemical cells 102. Interface module 110 may be also physically attached to various enclosure components of battery pack 100, such as end frames 124, housing member 125, and/or thermal control module 150. Furthermore, interface module 110 is electrically coupled to each of electrochemical cells 102 using, for example, laser welding, arc welding, soldering, and/or other methods. As such, first terminals 104 and second terminals 106 of electrochemical cells 102 are electrically coupled to control module 120 through interface module 110 or, more specifically, through bus bars 112 and voltage sense leads 114 of interface module 110.

Bus Bar Features

Each bus bar 112 comprises an electrically conductive material. Some examples of suitable conductive materials for bus bars 112 include copper, aluminum, nickel, and steel, stainless steel, alloys thereof, or combinations thereof. In some embodiments, all bus bars 112 are made from the same material. Furthermore, voltage sense leads 114 and bus bars 112 may be made from the same material. In some embodiments, all bus bars 112 may be formed from the same sheet of metal. Voltage sense leads 114 may be also made from the same sheet of metal and, as such, may be monolithic with bus bars to which they are individually connected. In some embodiments, thermistor leads are also formed from the same sheet of metal. Alternatively, thermistor leads may be positioned disposed on thermistor board 142 that is coplanar to bus bars 112 and further described below with reference to FIGS. 5 and 6.

Bus bars 112 may provide thermal conductive paths within interface module 110 and between different electrochemical cells 102 of battery pack 100. As such, bus bars 112 may be also referred to as thermal pads. It is to be appreciated that different sizes of bus bars 112 may be used for efficient heat transfer. Another consideration in selecting the sizes for bus bars 112 is the electrical connection scheme as further described below. In various implementations, bus bars 112 are formed using stamping process, e.g., from the same sheet of metal.

While FIG. 1 illustrates seven bus bars 112 interconnecting thirty fix electrochemical cells 102 (i.e., two rows of eighteen cells in each row as more clearly shown in FIG. 3), any number of bus bars 112 and electrochemical cells 102 may be used with a battery pack. In a specific embodiment, n electrochemical cells are electrically interconnected using n+1 bus bars 112.

The dimensions and arrangements of bus bars 112 determine the electrical interconnection of electrochemical cells 102 within battery pack 100. Therefore, it is to be appreciated that bus bars 112 can be modified to change the connection scheme. Interface module 110 uses bus bars 112 rather than electrical wires or connectors typically used in conventional battery packs. In a battery pack with many electrochemical cells replacing wiring and connectors with single interface module 110 can provide significant improvements in safety, robustness, and cost over conventional battery pack interconnects. Use of interface module 110 reduces or completely eliminates many interfaces (e.g., electrical wiring and connectors) thereby reducing the likelihood of mechanical and electrical failures. Furthermore, interface module 110 provides more efficient heat transfer between electrochemical cells 102.

Bus bars 112 may be between 0.5 and 3 mm thick or, more specifically, between 0.7 and 2.7 mm thick. In other examples, bus bars 112 are between 0.8 and 3 mm thick or, more specifically, between 0.8 mm thick and 1.3 mm thick or even between 0.8 mm thick and 1.2 mm thick. In some examples, bus bars 112 are 1.31 mm thick or 1.30 mm thick, 1.29 mm thick, 1.27 mm thick, 1.25 mm thick, 1.23 mm thick, 1.21 mm thick, 1.20 mm thick or 1.18 mm thick. In some examples, the bus bars are 1.31 mm thick. In some examples, the bus bars are 1.30 mm thick. In other examples, the bus bars are 1.29 mm thick. In some examples, the bus bars are 1.27 mm thick. In some examples, the bus bars are 1.25 mm thick. In other examples, the bus bars are 1.23 mm thick. In some examples, the bus bars are 1.21 mm thick. In some examples, the bus bars are 1.20 mm thick. In other examples, the bus bars are 1.18 mm thick.

Bus bars 112 may have a variety of shapes. In some examples, bus bars 112 are rectangular, or rectangular with rounded edges, and are approximately dimensioned 100 mm by 30 mm. In some non-limiting examples, bus bars 112 are rectangular, or rectangular with rounded edges, and are approximately dimensioned 200 mm by 30 mm. In some non-limiting examples, bus bars 112 are rectangular, or rectangular with rounded edges, and are approximately dimensioned 100 mm by 60 mm. In some examples, bus bars 112 are substantially shaped as shown in FIG. 1-2, 4-5, or 7.

Base Features

Base 111 comprises an electrically insulating material. Some examples of suitable electrically insulating materials for base 111 include polymers, and ceramics. Some examples of suitable electrically insulating materials for base 111 include, but are not limited to, plastics (e.g., polymer, rubbers) or polymers (e.g., pps, nylon, polycarbonate). Some examples of suitable electrically insulating materials for base 111 include, but are not limited to, plastics (e.g., polymer, rubbers) which are filled with ceramics (e.g., $Al_2O_3$, boron nitride, aluminum nitride). In some examples herein electrically insulating materials include engineering polymers such as, but not limited to, polyphenylene sulfide (PPS), nylon, or polycarbonate.

In some embodiments, the electrically insulating material of base 111 is thermally conductive. For example, base 111 may be formed from a thermally conductive ceramic, such as aluminum nitride, aluminum oxide, boron nitride, silicon oxide, silicon carbide, and magnesium oxide. In some embodiments, a composite having a polymer and thermally conductive filler (e.g., ceramic) may be used for base 111. For example, a ceramic-filled silicone rubber sponge may be used for base 111.

Base 111 mechanically supports bus bars 112. Base 111 and bus bars 112 may be assembled into interface module 110 prior to installing interface module 110 into battery pack 100. For example, base 111 may be over-molded over bus bars 112 during fabrication of interface module 110. Alternatively, base 111 and bus bars 112 may be disjoined structures prior to individually installing these structures on batter pack 100, and they interface module 110 when installed onto battery pack 100.

In some embodiments, base 111 may be flexible such that it allows bus bars 112 to move with respect to each other during operation of battery pack 100. This flexibility may be used to accommodate swelling of electrochemical cells 102 during their cycling and/or thermal expansion of different components, for example. Specifically, the flexibility of base 111 may allow electrochemical cells 102 to move in any of three directions (X, Y, and Z as shown in FIG. 1) with respect to each other without breaking the electrical connections to the respective bus bars 112.

Base 111 may include interlocking features for engaging with other components of battery pack 100, such as end frames 124, housing member 125, and/or thermal control module 125. Base 111 may be supported by one or more of these components. Alternative, base 111 may be supported by bus bars 112 or, more specifically, by attachment of bus bars 112 to electrochemical cells 102.

Connection Portion Features

Interface module 110 may include connecting portion 118 having multiple connecting leads 119. Each bus bar 112 may have a separate electrical connection to one of connecting leads 119 using, for example, one of voltage sense leads 114. Specifically, each voltage sense lead 114 extends between one or bus bars 112 and one of connecting leads 119 and does not contact any other electrical components. Because of very low currents used for sensing, connecting leads 119 have the same potential as corresponding bus bars 112 despite the small profile of voltage sense lead 114. As such, connecting leads 119 may be used for monitoring voltages between different pairs of bus bars 112 and/or between individual bus bars 112 and some reference potential.

In some embodiments, connecting portion 118 include additional connecting leads 119 that are not electrically connected to any of the bus bars 112. These additional connecting leads 119 may be connected to thermistors or some other devices of battery pack 100 as further described below with reference to FIG. 5.

In some embodiments, the thickness of voltage sense leads 114 is substantially the same as the thickness of bus bars 112. More specifically, all voltage sense leads 114 and all bus bars 112 may be stamped from the same sheet of metal. Voltage sense leads 114 may be substantially coplanar with two or more bus bars 112. For example, if the thickness of interface module 110 is defined by bus bars 112, then voltage sense leads 114 may be positioned within the boundaries defined by this thickness or extend beyond this boundary by less than 50% of the thickness. Voltage sense leads 114 may be integrated into base 111 in a manner similar to bus bars 112, e.g., by over-molding the material forming base 111.

In some embodiments, the thickness of voltage sense leads 114 is about the same as the thickness of bus bars 112. More specifically, all voltage sense leads 114 and all bus bars 112 may be stamped from the same sheet of metal. Voltage sense leads 114 may be coplanar with two or more bus bars 112. For example, if the thickness of interface module 110 is defined by bus bars 112, then voltage sense leads 114 may be positioned within the boundaries defined by this thickness or extend beyond this boundary by less than 50% of the thickness. Voltage sense leads 114 may be integrated into base 111 in a manner similar to bus bars 112, e.g., by over-molding the material forming base 111.

In some embodiments, the thickness of voltage sense leads 114 is substantially the same as the thickness of bus bars 112. More specifically, in some examples, all voltage sense leads 114 and all bus bars 112 may be cut out, or formed from, from the same sheet of metal. Voltage sense leads 114 may be substantially coplanar with two or more bus bars 112. For example, if the thickness of interface module 110 is defined by bus bars 112, then voltage sense leads 114 may be positioned within the boundaries defined by this thickness or extend beyond this boundary by less than 50% of the thickness. Voltage sense leads 114 may be integrated into base 111 in a manner similar to bus bars 112, e.g., by over-molding the material forming base 111.

In some embodiments, each bus bar 112 forms a monolithic structure with voltage sense lead 114, which connects this bus bar 112 to connecting lead 119. Bus bar 112 and corresponding connecting lead 119 may be formed from the same sheet of metal. Other bus bars 112 and connecting leads 119 of the same interface module 110 may be also formed from the same sheet but each pair of bus bar 112 and connecting lead 119 may be disjoined from each other pair during fabrication. In some examples, other bus bars 112 and connecting leads 119 of the same interface module 110 may be also cut from the same sheet but each pair of bus bar 112 and connecting lead 119 may be disjoined from each other pair during fabrication Examples of Spacing Members In some embodiments, base 111 of interface module 110 comprises spacing members 134 as, for example, illustrated in FIG. 5. Spacing members 134 may protrude in between terminals of electrochemical cells 102 and may directly interface with electrochemical cells 102. In some embodiments, spacing members 134 are substantially flexible and may be operable in a manner similar to spacing element 101 further described above with reference to FIG. 7. Unlike spacing element 101, spacing members 134 may extend between electrochemical cells 102 only partially, e.g., between about 5-10 millimeters below top surface 107 of electrochemical cells 102.

In some embodiments, spacing members 134 protrude only to top surface 107 of electrochemical cells 102. Specifically, spacing members 134 may protrude between first terminals 104 and second terminals 106 (and any other features extending from top surface 107 of electrochemical cells 102) and may contact top surface 107. This direct interface between spacing members 134 and electrochemical cells 102 may be used to transfer heat between interface module 110 and electrochemical cells 102 during operation of battery pack 100.

Spacing members 134 may be also used for electrical isolation of different conductive components in battery pack 100. For example, when a conductive component becomes loose (e.g., break away) in battery pack 100, spacing members 134 may prevent this component from causing shorts. As such, spacing members 134 may form an enclosure around each first terminal 104 and second terminal 106.

Figure 5:
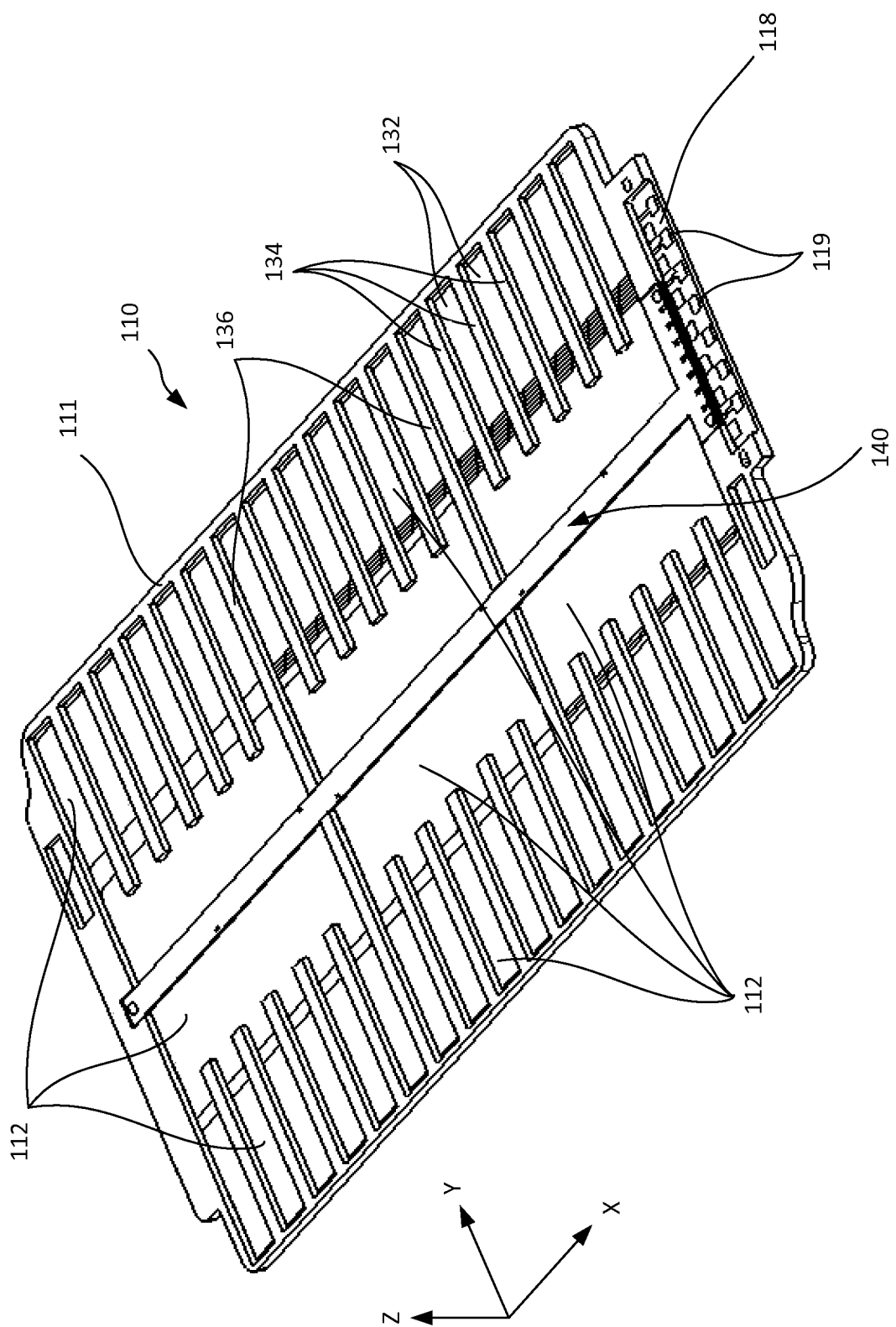
FIG. 5 is a bottom top isometric view of the interface module illustrating the bus bars, thermistor module, and spacing members, in accordance with some embodiments.

Some spacing members 134 may extend from the outer edge of base 111 towards the center of battery pack 100. One or more spacing members 134 may extend across battery pack 100 and may be referred to as cross-members 136. FIG. 5 illustrates two cross-members 136.

Examples of Thermistor Module

Figure 6:
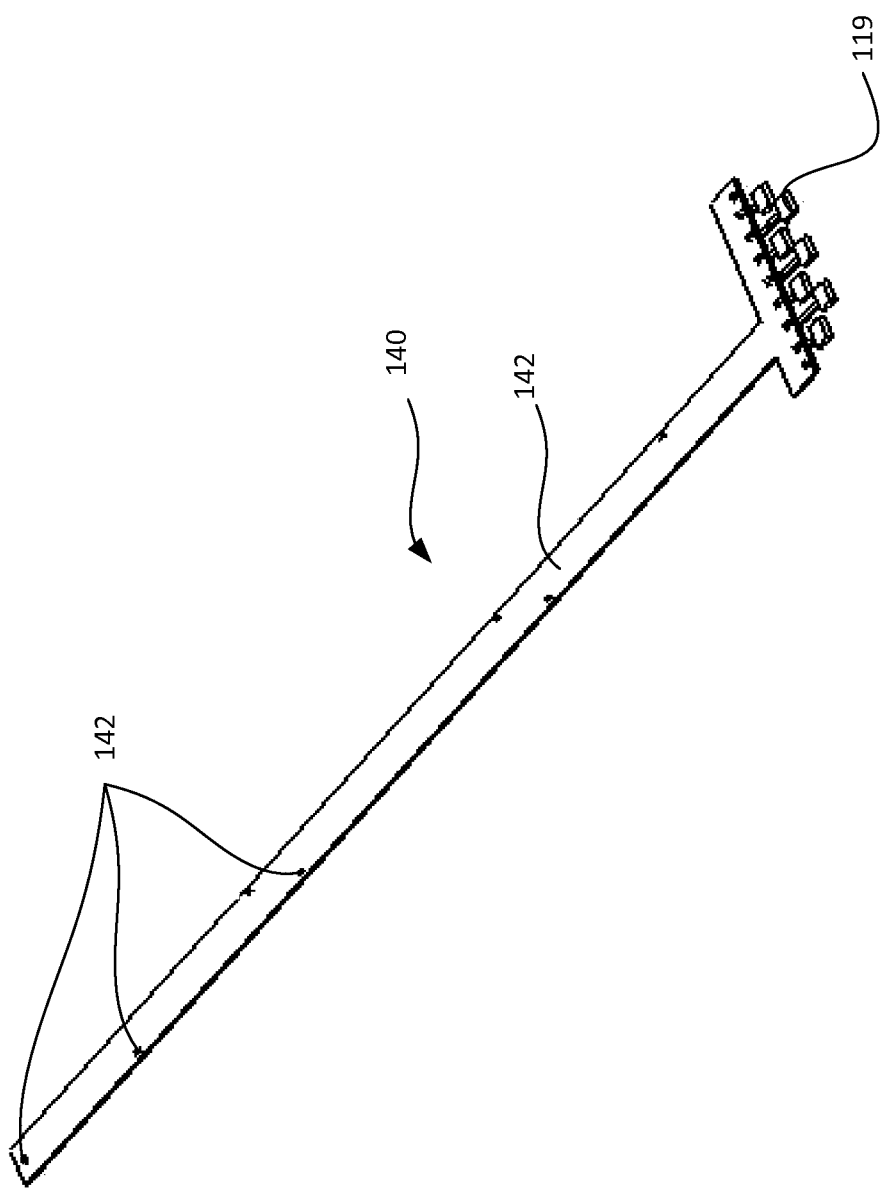
FIG. 6 is a schematic representation of the thermistor module of the interface module shown in FIG. 5, in accordance with some embodiments.

In some embodiments, interface module 110 comprises thermistor module 140 as, for example, illustrated in FIG. 5. Thermistor module 140 may extend the entire length of interface module 110 and may be attached to the back side of base 111 facing electrochemical cells 102. FIG. 6 is a schematic representation of thermistor module 140, in accordance with some embodiments. Thermistor module 140 may have multiple thermistors 142 disposed along the length of thermistor module 140. For example, each thermistor 142 may be positioned on different bus bar 112. Furthermore, each thermistor 142 may have a separate electrical connection to one of connecting leads 119. These connections may be positioned on thermistor board 142. Alternatively, structures similar to voltage sense leads 114 may be used for interconnecting thermistors 142 with connecting leads 119. The electrical connections between thermistors 142 and connecting leads 119 may be coplanar to bus bars 112. Thermistor module 140 may be integrated into base 111 of interface module 110.

Thermistor module 140 obtains temperature readings within battery pack 100 using thermistors 142. In some embodiments, thermistors 142 are configured to measure a range of −90° C. to 130° C. It is to be appreciated that other types of device can be used instead of thermistors 142, such as resistance temperature detectors, thermocouple, and other types thermal measurement devices.

Examples of Thermal Control Modules

In some embodiments, battery pack 100 also comprises thermal control module 150 thermally coupled to interface module 110. While interface module 110 may be designed to distribute the heat within battery pack 100, thermal control module 150 may be used to bring heat to battery pack 100 or remove heat from battery pack 100. Some examples of thermal control module 150 are illustrates in FIGS. 9-11.

Figure 11:
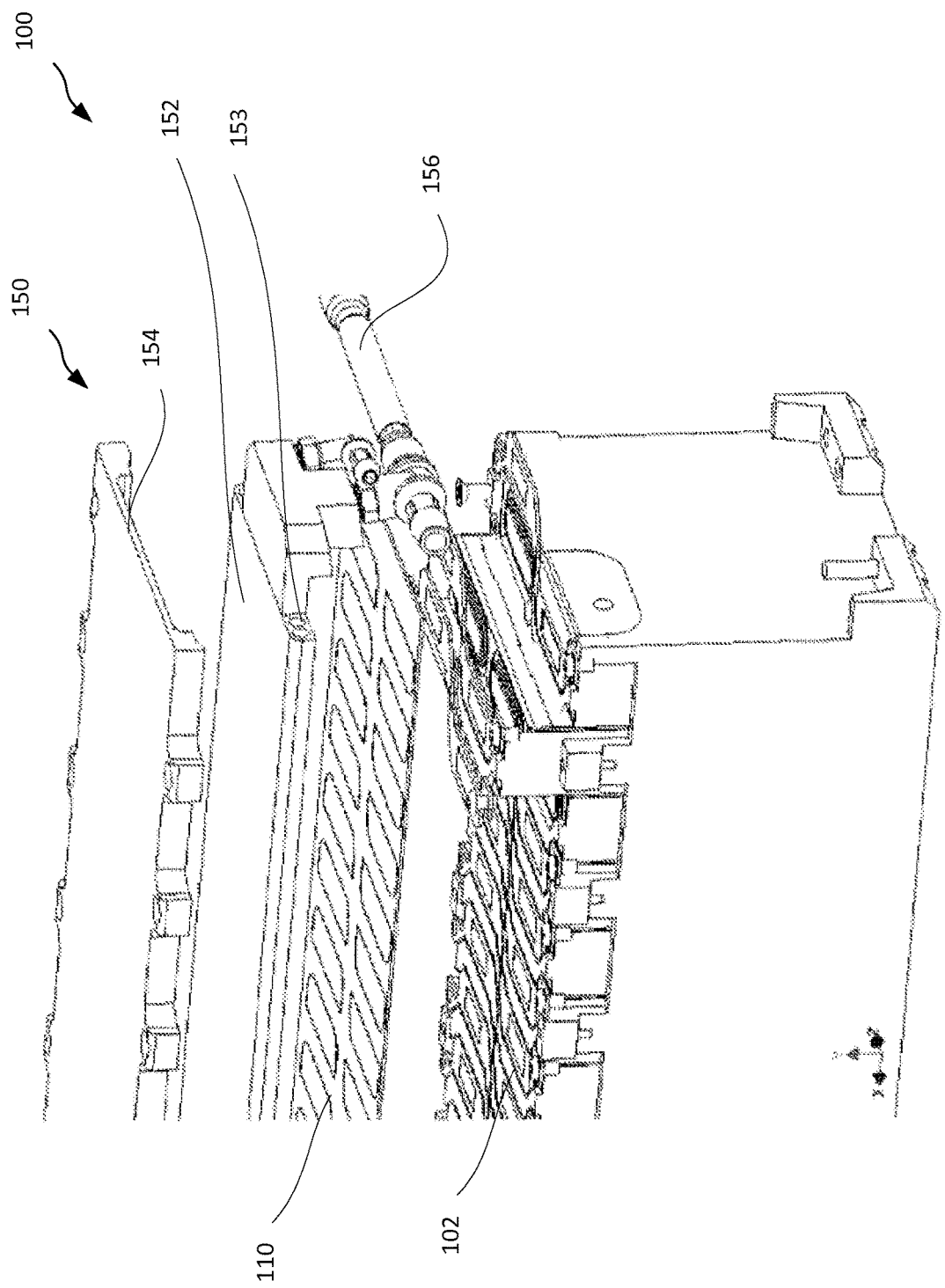
FIG. 11 is a schematic expanded view of a portion of the battery pack illustrating various components of the thermal control module, in accordance with some embodiments.

In some embodiments, thermal control module 150 comprises heat exchanger 152 having one or more manifolds 153 for transporting heat carrying fluid as, for example, shown in FIG. 11. Some examples of heat carrying fluids include water, oil, antifreeze, or any other suitable fluid having a sufficient heat capacity. The fluid may be circulated through heat exchanger 152 using one or more external pumps. In some embodiments, a pump may be integrated into thermal control module 150 and may be powered by battery pack 100. The flow of the fluid through heat exchanger 152 may be controlled by control module 120, which, for example, may control operations of these external pumps. The control may be based on the temperature of bus bars 112, for example, which may be detected using thermistor module 140. The fluid may be circulated between heat exchanger 152 of thermal control module 150 and some external heat exchanger, such as a radiator, that may cool and/or heat the fluid.

Examples of Electrochemical Cells and Connections

FIG. 3 is a schematic isometric view of battery pack 100 with interface module 110 not shown in order to illustrate top surface 107 of electrochemical cells 102, in accordance with some embodiments. Specifically, each electrochemical cell 102 includes first terminal 104 and second terminal 106, which has a different polarity that first terminal 104. For example, first terminal 104 may be a positive terminal and may be connected to positive electrodes of electrochemical cell 102, while second terminal 106 may be a negative terminal and may be connected to negative electrodes of electrochemical cell 102.

Figure 8B:
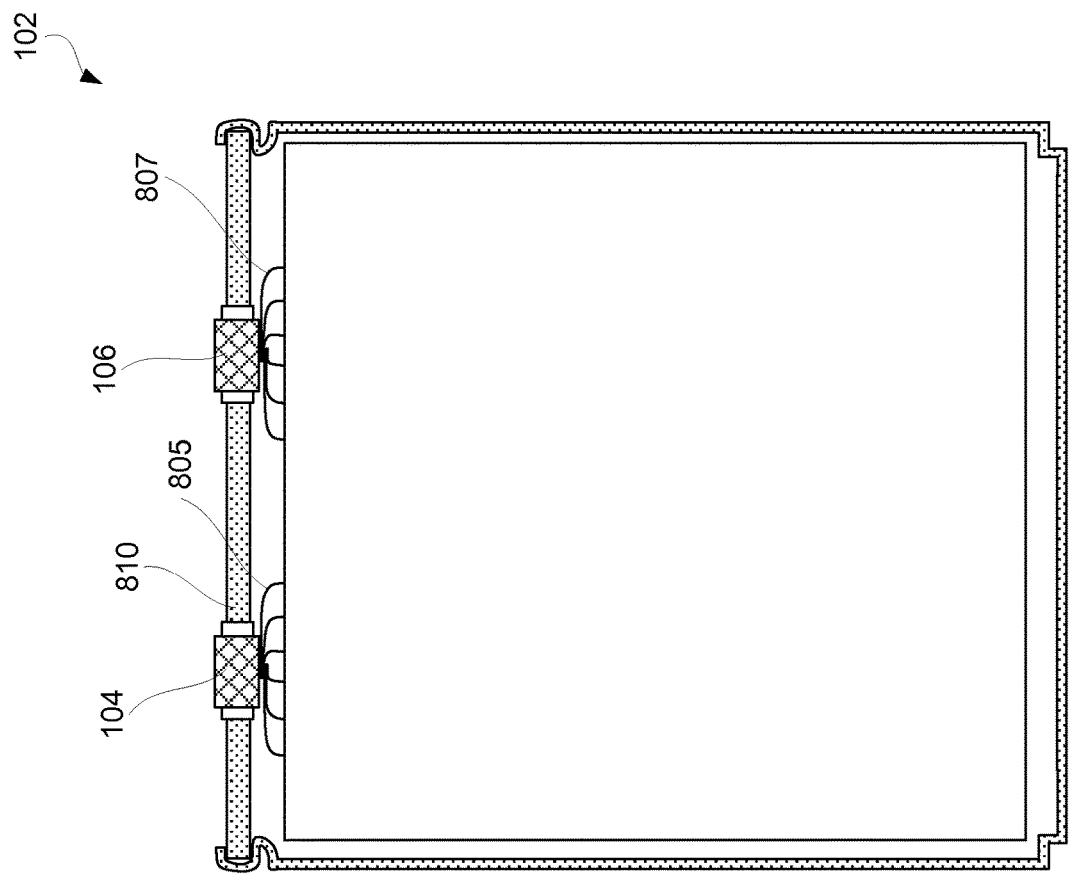
FIGS. 8A and 8B are schematic cross-sectional views of the electrochemical cell, in accordance with some embodiments.
Figure 8A:
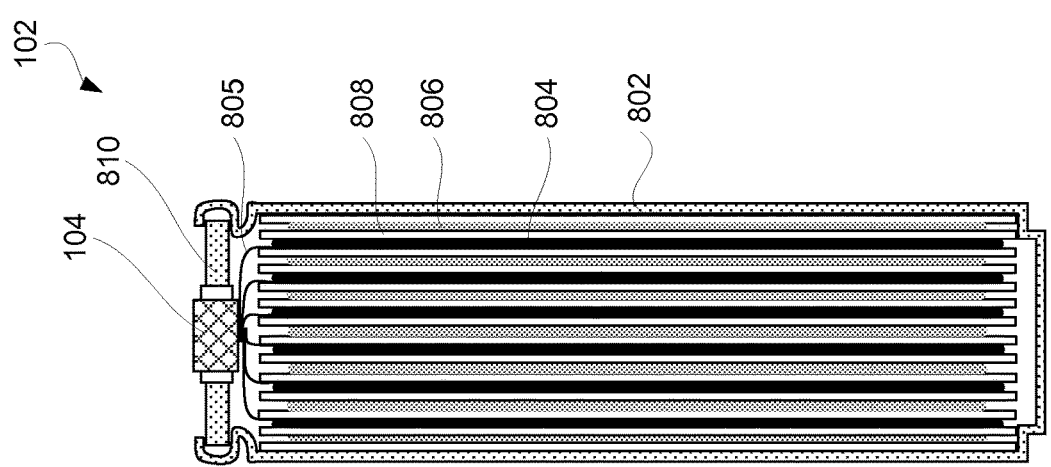

Internal configuration of electrochemical cell 102 is shown in FIGS. 8A and 8B. Electrochemical cell 102 includes one or more first electrodes 804 and one or more second electrodes 806. First electrodes 804 and second electrodes 806 are different types, e.g., positive and negative electrodes, and include corresponding active materials. First electrodes 804 and second electrodes 806 may be arranged as a stack, wound (e.g., wound as a jellyroll), or have any other arrangement such that active material layers of one type of electrodes face active material layers of the other type of electrodes.

First electrodes 804 and second electrodes 806 are in ionic communication with each other. Various types of electrolytes (e.g., liquid, solid, polymer) may provide the ionic communication between the two types of electrodes. Furthermore, each pair of adjacent first electrode 804 and second electrode 806 may be separated by a sheet of separator 808 to provide electrical isolation between first electrode 804 and second electrode 806. First electrodes 804 are electrically coupled to first terminal 104 using, for example, first tabs 805. Second electrodes 806 are electrically coupled to second terminal 106 using, for example, second tabs 807.

First electrode 804 and second electrode 806 may have a relatively small thickness, for example, to allow a large number of electrodes to be stacked together and fit into the same electrochemical cell. For example, a thickness of each electrode may be between about 20 micrometers and 500 micrometers or, more specifically, between about 50 micrometers and 200 micrometers, such as about 100 micrometers. With 100 to 300 electrodes stacked together, electrochemical cell 102 may have a thickness of between about 10 millimeters and 30 millimeters. It is to be appreciated that other dimensions are possible as well. For example, the number of first electrode 804 and second electrode 806 being stacked together can be based on the electrical characteristics of electrochemical cell 102. Furthermore, thinner electrodes may be more effective for heat redistribution within electrochemical cell 102 than thicker electrodes (collectively providing the same electrochemical capacity).

In some embodiments, first tabs 805 may be formed from current collectors of first electrodes 804, while second tabs 807 may be formed from current collectors of second electrodes 806. First terminal 104 and second terminal 106 may be supported by top cover 810 as shown in FIG. 8B. Alternatively, first tabs 805 and second tabs 807 may be structure that are welded, crimped, or otherwise attached to the current collectors of the respective electrodes. Regardless of tab design, first tabs 805 and second tabs 807 may be arranged into two separate groups to provide electrical and thermal interface to first terminal 104 and second terminal 106, respectively. In a specific embodiment, first tabs 805 are welded together and to first terminal 104 and second tabs 807 are welded together and to second terminal 106.

First electrodes 804 and second electrodes 806 may be sealed within an enclosure including case 802 and top cover 810. In some embodiments, case 802 of electrochemical cell 102 is substantially rigid. For example, case 802 may be made of a hard plastic or polymer material. In some embodiments, cell 800 has a housing or claim to maintain a pressure within cell 800 during operation (charge/discharge) of cell 800. In some embodiment, cell 800 has a bladder or foam piece within cell 800 to maintain a pressure within cell 800 during operation (charge/discharge) of cell 800. Case 802 may be operable at high temperatures, such as at least about 80° C. or even at least about 100° C. In some examples, the operable temperature is 25° C., or 40° C., 50° C., 55° C., 65° C., 70° C., 80° C., 85° C., 90° C., 95° C., 100° C., 105° C., 110° C., 115° C., 120° C., or 125° C. In some examples, the operable temperature is 25° C. In some examples, the operable temperature is 40° C. In some examples, the operable temperature is 50° C. In some examples, the operable temperature is 55° C. In some examples, the operable temperature is 60° C. In some examples, the operable temperature is 65° C. In some examples, the operable temperature is 70° C. In some examples, the operable temperature is 75° C. In some examples, the operable temperature is 80° C. In some examples, the operable temperature is 85° C. In some examples, the operable temperature is 25° C. In some examples, the operable temperature is 90° C. In some examples, the operable temperature is 95° C. In some examples, the operable temperature is 55° C. In some examples, the operable temperature is 100° C. In some examples, the operable temperature is 105° C. In some examples, the operable temperature is 110° C. In some examples, the operable temperature is 115° C. In some examples, the operable temperature is 120° C. In some examples, the operable temperature is 125° C.

In some embodiments, first terminal 104 and second terminal 106 of electrochemical cell 102 represent at least about 30% of the total surface of the top side (e.g., top cover 810) or, more specifically, at least about 40% or even at least about 50%. First terminal 104 and second terminal 106 are electrically coupled to current collector substrates and, as a result, may have better thermal coupling to electrodes 804 and 806 of electrochemical cell 102 than the rest of the surface of the top cover. Furthermore, the connector terminals are made from conductive materials, such as copper, aluminum, gold, silver, zinc, steel, and the like, that are thermally conductive. The larger surface area occupied by the connector terminals help to improve thermal coupling within electrochemical cell 102 and between electrochemical cell 102 and interface module 110. In some embodiments, the entire top surface of each connector terminal interfaces with one of bus bars 112 of interface module 110. In some embodiments, the top surface of each connector terminal interfaces is substantially flat to ensure thermal coupling with one of bus bars 112 of interface module 110.

In some embodiments, electrochemical cells 102 also include reference terminal 105, which may be used, for example, to independently measure a potential of first terminal 104 and second terminal 106 rather than measuring a voltage between first terminal 104 and second terminal 106. For example, if electrochemical cell 102 is a lithium ion cell, then reference terminal 105 may be connected to a lithium reference electrode disposed within electrochemical cell 102 and in ionic communication with both negative and positive electrodes. Reference terminal 105 may allow determining the state of charge and state of discharge of electrochemical cell 102 more precisely than simply measuring the voltage between first terminal 104 and second terminal 106. When reference terminals 105 are present, these terminals may not be connected to bus bars 112 similar to first terminals 104 and second terminals 106. However, reference terminals 105 may be individually connected to connecting leads 119 using voltage sense leads 114, which do not connect to any bus bars 112.

Returning to FIGS. 1 and 3, bus bars 112 electrically interconnect first terminals 104 and second terminals 106 of electrochemical cells 102 in battery pack 100 in according to a specific connection scheme defined for this battery pack 100. These connections may be established using one of welding, attaching using thermal epoxy adhesive. Electrochemical cells 102 may be interconnected in series, in parallel, or various combinations of these two techniques. The interconnection scheme depends on power, voltage, electrochemical cell types, and other factors and will be understood by one having ordinary skills in the art. For example, electrochemical cells 102 may be interconnected in parallel in each of multiple groups. These groups may be then interconnected in series thereby forming a "parallel first, series second" type of configuration. The parallel connection in one group may be established by one bus bar 112 interconnecting all first terminals 104 of electrochemical cells 102 in this group and another one bus bar 112 interconnecting all second terminals 106 of electrochemical cells 102 in the same group. These two bus bars may be also connected to other bus bars 112 either within interface module 110 or by external circuitry. In some embodiments, the same bus bar may be connected to the first terminal of one cell and the second terminal of another cell. It should be noted that regardless of electrical connections, the bus bars does not electrically short any of the plurality of electrochemical cells. When the external circuitry is used for interconnecting bus bars 112 within the same interface module 110, these connections may be dynamically adjusted based on the power output requirements.

In some embodiments, bus bars 112 are electrically connected to first terminal 104 and second terminal 106 of each electrochemical cell 102 using flexible connectors 109 as, for example, shown in FIG. 7. Specifically, flexible connectors 109 allow bus bars 112 to move with respect to first terminal 104 and/or second terminal 106 of each electrochemical cell 102 while maintaining bus bars 112 electrically connected to first terminal 104 and second terminal 106 of each electrochemical cell 102. This flexibility may be needed to accommodate swelling of electrochemical cell 102 during their cycling, thermal expansion of different components, and other reasons. For example, flexible connectors 109 may be formed from flexible tabs or flexible conductive adhesive.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A battery pack comprising:
a plurality of electrochemical cells, wherein each of the plurality of electrochemical cells comprises a first terminal and a second terminal; and
an interface module having a substantially planar shape;
wherein the interface module comprises two or more bus bars, voltage sense leads, and a base; wherein the voltage sense leads connect the two or more bus bars to the interface module; wherein the bus bars have a substantially planar shape;
wherein:
the electrochemical cells are arranged between two end frames;
the interface module is substantially orthogonal to the end frames;
each of the two or more bus bars comprises an electrically conductive material;
the base comprises an electrically insulating material and mechanically supports the two or more bus bars;
the two or more bus bars electrically interconnect the plurality of electrochemical cells within the battery pack; and
the thickness of the voltage sense leads and the thickness of the two or more bus bars is substantially the same;
each of the two or more bus bars forms a monolithic structure with the voltage sense leads; and
wherein the electrically insulating material of the base is thermally conductive with a thermal conductivity between about 2 W/m-K and 100 W/m-K.

2. The battery pack of claim 1, wherein the first terminal and the second terminal of each of the plurality of electrochemical cells are disposed on a same side of each of the plurality of electrochemical cells facing the interface module.

3. The battery pack of claim 1, wherein the interface module further comprises a connecting portion having multiple connecting leads, wherein each of the two or more bus bars has a separate electrical connection to one of the multiple connecting leads.

4. The battery pack of claim 3, wherein each of the two or more bus bars is electrically connected to one of the multiple connecting leads using one of the voltage sense leads.

5. The battery pack of claim 4, wherein the voltage sense leads are coplanar with the two or more bus bars.

6. The battery pack of claim 3, further comprising a control module connected to the multiple connecting leads of the connecting portion and configured to control external electrical connections to each of the two or more bus bars.

7. The battery pack of claim 6, wherein the control module is supported on an end frame of the battery pack and extends substantially normal to the interface module.

8. The battery pack of claim 3, wherein the interface module further comprises a thermistor module having multiple thermistors positioned in different locations of the interface module, wherein each of the multiple thermistors has a separate electrical connection to one of the multiple connecting leads.

9. The battery pack of claim 8, wherein each of the multiple thermistors is positioned on a different one of the two or more bus bars.

10. The battery pack of claim 1, wherein the base comprises spacing members protruding in between the first terminal and the second terminal of each of the plurality of electrochemical cells.

11. The battery pack of claim 1, further comprising a thermal control module thermally coupled to the interface module, wherein the thermal control module comprises a heat exchanger having one or more manifolds for transporting heat carrying fluid.

12. The battery pack of claim 1, wherein the two or more bus bars are electrically connected to the first terminal and the second terminal of each of the plurality of electrochemical cells using flexible connectors,
wherein the flexible connectors allow the two or more bus bars to move with respect to the first terminal and the second terminal of each of the plurality of electrochemical cells while maintaining the two or more bus bars electrically connected to the first terminal and the second terminal of each of the plurality of electrochemical cells.

13. The battery pack of claim 1, wherein the base is flexible and allows the two or more bus bars to move with respect to each other during operation of the battery pack.

14. The battery pack of claim 1, wherein the interface module has a thickness of less than 10 millimeters.

15. The battery pack of claim 1, wherein the interface module is operable as a cover of the battery pack.

16. The battery pack of claim 15, wherein a surface of the interface module facing away from the plurality of electrochemical cells is substantially insulating.

17. The battery pack of claim 1, wherein the interface module is conformal to top surfaces of the plurality of electrochemical cells.

18. The battery pack of claim 1, wherein the two or more bus bars are electrically connected to the first terminal and the second terminal of each of the plurality of electrochemical cells such that any of the two or more bus bars does not electrically short any of the plurality of electrochemical cells.

19. The battery pack of claim 1, wherein each of the two or more bus bars is electrically connected to two terminals of different cells of the plurality of electrochemical cells thereby electrically interconnecting the plurality of electrochemical cells within the battery pack.

20. The battery pack of claim 19, wherein each of the two or more bus bars is electrically connected to (i) the first terminal of one cell of the plurality of electrochemical cells and to the first terminal of another cell of the plurality of electrochemical cells, to (ii) the second terminal of one cell of the plurality of electrochemical cells and to the second terminal of another cell of the plurality of electrochemical cells, or to (iii) the first terminal of one cell of the plurality of electrochemical cells and to the second terminal of another cell of the plurality of electrochemical cells.

21. The battery pack of claim 1, wherein the battery pack further comprises a thermal control module thermally coupled to the interface module.

22. The battery pack of claim 1, wherein the battery pack further comprises a thermal control module in contact with the interface module.

23. The battery pack of claim 22, wherein the thermal control module comprises a heat exchanger.

* * * * *